(12) United States Patent
Min et al.

(10) Patent No.: US 12,219,257 B2
(45) Date of Patent: Feb. 4, 2025

(54) LENS DRIVING DEVICE, CAMERA MODULE, AND OPTICAL DEVICE

(71) Applicant: LG INNOTEK CO., LTD., Seoul (KR)

(72) Inventors: Sang Jun Min, Seoul (KR); Kyoung Ho Yoo, Seoul (KR); Jun Taek Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 175 days.

(21) Appl. No.: 18/019,608

(22) PCT Filed: May 27, 2021

(86) PCT No.: PCT/KR2021/006604
§ 371 (c)(1),
(2) Date: Feb. 3, 2023

(87) PCT Pub. No.: WO2022/055075
PCT Pub. Date: Mar. 17, 2022

(65) Prior Publication Data
US 2024/0040253 A1     Feb. 1, 2024

(30) Foreign Application Priority Data
Sep. 14, 2020   (KR) .................. 10-2020-0117601

(51) Int. Cl.
*H04N 23/68* (2023.01)
*H04N 23/51* (2023.01)
(Continued)

(52) U.S. Cl.
CPC ........... *H04N 23/687* (2023.01); *H04N 23/51* (2023.01); *H04N 23/54* (2023.01); *H04N 23/55* (2023.01); *H04N 23/63* (2023.01)

(58) Field of Classification Search
CPC . G03B 3/10; G03B 30/00; G03B 5/02; G03B 2205/0015; G03B 2205/0069;
(Continued)

(56) References Cited

U.S. PATENT DOCUMENTS 8,218,957 B2 * 7/2012 Lee .................. H04N 23/54
396/55
8,908,272 B2 * 12/2014 Ezawa ................ H04N 23/687
359/554

(Continued)

FOREIGN PATENT DOCUMENTS

JP      2012-32543 A    2/2012
JP      2014-115493 A   6/2014
(Continued)

*Primary Examiner* — Pritham D Prabhakher
(74) *Attorney, Agent, or Firm* — Birch, Stewart, Kolasch & Birch, LLP

(57) ABSTRACT

The present embodiment relates to a lens driving device, comprising: a fixed portion; a mover which is disposed so as to be movable relative to the fixed portion and comprises a housing and a holder; and a driving unit for moving the mover, wherein the driving unit comprises a first driving unit for moving the holder and a second driving unit for moving the housing, and at least a part of the first driving unit and at least a part of the second driving unit are disposed on a first side of the fixed portion.

16 Claims, 19 Drawing Sheets

(51) Int. Cl.
*H04N 23/54* (2023.01)
*H04N 23/55* (2023.01)
*H04N 23/63* (2023.01)

(58) Field of Classification Search
CPC ........ H04N 23/54; H04N 23/55; H04N 23/51; H04N 23/57; H04N 23/687; H04N 23/63; G02B 7/08; G02B 27/646
USPC .................................................... 348/208.11
See application file for complete search history.

(56) References Cited

U.S. PATENT DOCUMENTS

| | | | | |
|---|---|---|---|---|
| 9,319,574 | B2 * | 4/2016 | Shin ................ | G02B 27/646 |
| 9,891,443 | B2 * | 2/2018 | Hamada ............ | H04N 23/55 |
| 10,558,058 | B2 * | 2/2020 | Bachar ............. | G02B 13/001 |
| 10,924,644 | B2 * | 2/2021 | Hwang ............. | H04N 23/57 |
| 11,159,727 | B2 * | 10/2021 | Lee ................. | G02B 13/0065 |
| 11,283,976 | B2 * | 3/2022 | Yu ................... | G02B 7/102 |
| 11,287,603 | B2 * | 3/2022 | Lim ................. | G02B 27/646 |
| 11,297,174 | B2 * | 4/2022 | Jeong .............. | H04N 23/55 |
| 11,347,074 | B2 * | 5/2022 | Minamisawa ..... | G02B 27/646 |
| 2011/0097061 | A1 | 4/2011 | Lee et al. | |
| 2012/0075700 | A1 | 3/2012 | Ezawa | |
| 2014/0362284 | A1 * | 12/2014 | Shin ................. | G02B 27/646 |
| | | | | 348/373 |
| 2015/0370086 | A1 | 12/2015 | Hamada et al. | |
| 2019/0162930 | A1 * | 5/2019 | Min ................. | G01D 5/2291 |
| 2019/0227338 | A1 | 7/2019 | Bachar et al. | |
| 2019/0238728 | A1 | 8/2019 | Hwang et al. | |
| 2019/0373145 | A1 * | 12/2019 | Yu ................... | G02B 7/102 |
| 2020/0225443 | A1 * | 7/2020 | Lim ................. | G02B 7/08 |
| 2020/0363614 | A1 * | 11/2020 | Kwon .............. | G03B 5/00 |
| 2020/0404085 | A1 * | 12/2020 | Jeong .............. | H04M 1/0214 |
| 2020/0404181 | A1 * | 12/2020 | Lee ................. | G03B 30/00 |

FOREIGN PATENT DOCUMENTS

| | | |
|---|---|---|
| KR | 10-2011-0045343 A | 5/2011 |
| KR | 10-2019-0061439 A | 6/2019 |
| KR | 10-2020-0068886 A | 6/2020 |

* cited by examiner

LENS DRIVING DEVICE, CAMERA MODULE, AND OPTICAL DEVICE

CROSS REFERENCE TO RELATED APPLICATIONS

This application is the National Phase of PCT/KR2021/006604 filed on May 27, 2021, which claims priority under 35 U.S.C. § 119 (a) to Patent Application No. 10-2020-0117601 filed in the Republic of Korea on Sep. 14, 2020, all of which are hereby expressly incorporated by reference into the present application.

TECHNICAL FIELD

The present embodiment relates to a lens driving device, a camera module, and an optical device.

BACKGROUND ART

As the spread of various portable terminals is widely generalized and wireless Internet services are commercialized, the demands of consumers related to portable terminals are also diversifying, so that various types of additional devices are being installed in the portable terminals.

Among them, a typical example is a camera module that photographs a picture or video of a subject. Meanwhile, an auto focus function for automatically adjusting a focus according to a distance of a subject is applied to a recent camera module. In addition, a handshake correction function for compensating the user's handshake is also applied.

However, in the case of a spring-type module, since the elastic force of the spring acts, current must continuously flow in order to move the lens to a desired position, resulting in increased current consumption.

In addition, as the adoption of high-pixel image sensors increases, the weight and size of lenses also increase, and the increase in the weight of the driving unit in the existing spring or suspension wire method becomes a risk factor in terms of performance and reliability.

DETAILED DESCRIPTION OF THE INVENTION

Technical Subject

The present embodiment is intended to provide a ball-type lens driving device capable of reducing current consumption compared to a spring-type lens driving device.

Furthermore, it is intended to provide a lens driving device capable of adopting a large-diameter lens.

Technical Solution

The lens driving device according to the present embodiment comprises: a fixed portion; a mover being disposed so as to be movable relative to the fixed portion and comprising a housing and a holder; and a driving unit for moving the mover, wherein the driving unit comprises a first driving unit for moving the holder and a second driving unit for moving the housing, and wherein at least a portion of the first driving unit and at least a portion of the second driving unit may be disposed on a first side surface of the fixed portion.

The first driving unit comprises a first coil and a first magnet, and the second driving unit may comprise a second coil and a second magnet.

The first coil and the second coil may be disposed on the first side surface of the fixed portion.

The first magnet and the second magnet may be disposed on the first side surface of the fixed portion.

The fixed portion may comprise a base and a substrate being disposed in the base, the base may comprise first to fourth side surfaces, and the substrate may comprise a first portion being disposed on the first side surface of the base.

The first coil may move the holder in a direction perpendicular to an optical axis direction, and the second coil may move the holder and the housing in the optical axis direction.

The second side surface of the base is disposed at an opposite side of the first side surface of the base, the substrate comprises a second portion being disposed on the second side surface of the base, and the first coil and the second coil respectively may comprise a coil being disposed in the second portion of the substrate.

The third side surface of the base is disposed at an opposite side of the fourth side surface of the base, the substrate comprises a third portion being disposed on the third side surface of the base and a fourth portion being disposed on the fourth side surface of the base, and the second coil may not be disposed in the third portion and the fourth portion of the substrate.

The first coil may comprise coils being disposed in the third and fourth portions of the substrate.

The first magnet may comprise four magnets respectively disposed on four side surfaces of the holder, and the second magnet may comprise two magnets being disposed respectively on two side surfaces being disposed at an opposite side of the housing.

The lens driving device may comprise a first ball being in contact with the holder and the housing, and the first ball may be disposed on an upper surface of the holder.

The lens driving device may comprise a first yoke disposed on an upper surface of the housing, and the first yoke may be overlapped with the first magnet and the first ball in an optical axis direction.

The first ball comprises four balls, and a virtual plane connecting the centers of the four balls may be perpendicular to the optical axis direction.

A second ball being in contact with the housing and the base may be comprised, and the second ball may comprise two balls being disposed symmetrically with respect to an optical axis.

A second yoke being disposed in the substrate is comprised, and the second yoke may be overlapped with the second magnet in a direction perpendicular to an optical axis direction.

The first magnet comprises a magnet facing the first coil being disposed in the first portion of the substrate, and the second magnet may comprise a magnet facing the second coil being disposed in the first portion of the substrate.

The base comprises two protruding portions being protruded from the third side surface of the base and being spaced apart from each other in an optical axis direction, wherein the third portion of the substrate comprises a first region being disposed with the first coil, and a second region being extended from the first region and disposed between the two protruding portions of the base, and wherein in an optical axis direction, the length of the first region of the substrate may be longer than the length of the second region of the substrate.

The lens driving device may comprise a driver IC comprising a Hall element detecting the second magnet, and being disposed in the first portion of the substrate, and being electrically connected to the second coil.

The lens driving device comprises a Hall sensor being disposed in the substrate and sensing the first magnet, wherein the Hall sensor may comprise a first Hall sensor detecting the movement of the holder in a first direction perpendicular to the optical axis direction, and a second Hall sensor detecting the movement of the holder in a second direction perpendicular to the optical axis direction and the first direction.

The substrate comprises a plurality of terminals, wherein the plurality of terminals of the substrate may comprise four terminals being electrically connected to the driver IC, two terminals being electrically connected to coils being disposed on a first imaginary plane among the first coils, two terminals being electrically connected to coils being disposed on a virtual second plane perpendicular to the first plane among the first coils, four terminals being electrically connected to the first Hall sensor, and four terminals being electrically connected to the second Hall sensor.

The lens driving device may comprise: an upper plate; a side plate being extended from the upper plate; and a cover member covering the base, wherein the side plate of the cover member may be coupled to the base.

The camera module according to the present embodiment may comprise: a printed circuit board; an image sensor being disposed in the printed circuit board; the lens driving device being disposed on the printed circuit board; and a lens being coupled to the holder of the lens driving device.

The optical device according to the present embodiment may comprise: a main body; the camera module disposed in the main body; and a display being disposed in the main body and outputting at least one of an image and a video photographed by the camera module.

The lens driving device according to the present embodiment comprises: a base comprising first to fourth side surfaces; a housing moving in a vertical direction with respect to the base; a holder moving in a horizontal direction with respect to the housing; a first driving unit for moving the housing; and a second driving unit for moving the holder, wherein a part of the first driving unit is disposed on the first side surface and the third side surface facing each other, wherein the second driving unit comprises a first unit driving unit being partially disposed on the first side surface and a second unit driving unit being partially disposed on the fourth side surface, and wherein the first unit driving unit and the second unit driving unit may move the holder in different directions.

Another part of the first unit driving unit is disposed on the third side surface opposite to the first side surface, and another part of the second unit driving unit may be disposed on the second side surface at an opposite side of the fourth side surface.

The first unit driving unit being disposed on the first side surface and the third side surface may be a first unit coil.

The first unit coil may be at least two, and one of the two is disposed on the first side surface and the other one may be disposed on the third side surface.

A first unit magnets being disposed to correspond to the first unit coils in comprised, and the number of first unit magnets is at least two and may be coupled to the holder.

The first driving unit being disposed on the first side surface and the third side surface may be a first coil.

The first driving unit may comprise a first magnet being coupled to the housing and corresponding to the first coil.

The lens driving device according to the present embodiment comprises: a base comprising first to fourth side surfaces; a housing moving in a vertical direction with respect to the base; a holder moving in a horizontal direction with respect to the housing; and a driving unit for moving the holder, wherein the driving unit comprises a first unit driving unit comprising a first unit coil or a first unit magnet being disposed on the first side surface, and a second unit driving unit comprising a second unit coil or a second unit magnet being disposed on the fourth side surface, wherein the first unit driving unit and the second unit driving unit move the holder in different directions, wherein the base comprises a first corner where the first side surface and the fourth side surface meet and a fourth corner where the third side surface and the fourth side surface meet, wherein each of the first unit coil and the second unit coil is in plurality, and one first unit coil and one second unit coil among the plurality may be disposed closer to the first corner than to the fourth corner.

The base comprises a third corner in a direction diagonal to the first corner, wherein the first unit coil which is one among the plurality and the second unit coil which is the other one may be disposed closer to the third corner than to the fourth corner.

The lens driving device according to the present embodiment comprises: a fixed portion; a mover being movably disposed to move relative to the fixed portion and comprising a housing and a holder; a driving unit for moving the mover; and a guide part being disposed between the housing and the holder, wherein the driving unit comprises a first driving unit for moving the housing and a second driving unit for moving the holder, wherein the guide part comprises a retainer comprising first and second balls, a first hole accommodating the first ball, and a second hole accommodating the second ball, and wherein the first ball rotates inside the first hole, and the second ball may rotate inside the second hole.

The second driving unit may comprise: a first unit driving unit for driving the holder in a first direction by the first ball and the second ball; and a second unit driving unit for driving the holder in a second direction different from the first direction by the first ball and the second ball.

The first ball and the second ball may be spaced apart from each other by the first hole and the second hole.

The distance between the first ball and the second ball may be greater than or equal to the distance between the first hole and the second hole.

The lens driving device according to the present embodiment comprises: a base; a housing being disposed inside the base; a holder being disposed inside the housing; and a guide part being disposed between the holder and the housing, wherein the guide part comprises a retainer comprising a hole and a ball being disposed in the hole, and wherein the guide part may be disposed to be overlapped with the holder and the housing in an optical axis direction.

The lens driving device according to the present embodiment comprises a base; a housing disposed to move in an optical axis direction; a holder disposed to move in a direction perpendicular to the optical axis direction; and a guide part being disposed between the holder and the housing, wherein the guide part may comprise a retainer and a ball being disposed in the retainer.

The retainer is coupled to the holder or the housing, and the ball may move or roll in a direction perpendicular to the optical axis direction.

The retainer may perform a function of a yoke.

A magnet being disposed in the holder may be comprised, and an attractive force may act between the retainer and the magnet.

The lens driving device according to the present embodiment comprises: a base; a housing being disposed inside the base; a holder being disposed inside the housing; a first magnet being disposed in the holder; a second magnet being disposed in the housing; a substrate being disposed in the base; a first coil being disposed in the substrate and facing the first magnet; a second coil being disposed in the substrate and facing the second magnet; a first ball being in contact with the holder and the housing; and a first yoke being fixed to the housing and overlapped with the first magnet in an optical axis direction, wherein the first yoke may comprise a hole in which the first ball is disposed.

The diameter of the hole of the first yoke may correspond to the diameter of the first ball or formed to be larger than the diameter of the first ball.

The first ball may be rotatably disposed in the hole of the first yoke.

The first yoke comprises two side plates whose upper ends are fixed to the housing and a connection plate connecting the two side plates, wherein the hole of the first yoke may be formed in the connection plate.

The connection plate of the first yoke may be overlapped with the center of the first ball in a direction perpendicular to the optical axis direction.

The holder comprises: a first side surface and a second side surface being disposed at an opposite side to each other; a third side surface and a fourth side surface being disposed at an opposite to each other, wherein the first magnet comprises: a first-first magnet being disposed on the first side surface of the holder; a first-second magnet being disposed on the second side surface of the holder; a first-third magnet being disposed on the third side surface of the holder; and a first-fourth magnet being disposed on the fourth side surface of the holder, and wherein the first yoke may comprise: a first-first yoke being overlapped with the first-first magnet in the optical axis direction; a first-second yoke being overlapped with the first-second magnet in the optical axis direction; a first-third yoke being overlapped with the first-third magnet in the optical axis direction; and a first-fourth yoke being overlapped with the first-fourth magnet in the optical axis direction.

The hole of the first yoke may be formed three each at equal intervals in each of the first-first to first-fourth yokes.

The housing may comprise an upper plate and a side plate being extended downward from the upper plate, and the first ball may be disposed between the upper plate of the housing and an upper surface of the holder.

The first yoke is fixed to a lower surface of the upper plate of the housing, and the first yoke may be disposed closer to any one of two corner regions of the upper surface of the holder.

The holder may comprise a protruding portion protruding from a side surface of the holder and a groove being formed in the protruding portion, and the first magnet may be disposed in the groove of the holder.

The housing may comprise a groove being formed on an inner surface of the side plate of the housing, and at least a portion of the protruding portion of the holder may be disposed in the groove of the housing.

The side plate of the housing comprises a first portion of the housing in which the groove is formed and a second portion of the housing in which the groove is not formed, and the second magnet may be disposed in the second portion of the housing.

The first yoke may be formed of a magnetic material.

The base comprises first to fourth side surfaces, the substrate comprises a first portion being disposed on the first side surface of the base, and each of the first coil and the second coil may comprise a coil being disposed in the first portion of the substrate.

The first coil may move the holder in a direction perpendicular to the optical axis direction, and the second coil may move the holder and the housing in the optical axis direction.

The second side surface of the base is disposed at an opposite side of the first side surface of the base, the substrate comprises a second portion being disposed on the second side surface of the base, and the first coil and the second coil respectively may comprise a coil being disposed in the second portion of the substrate.

The third side surface of the base is disposed at an opposite side of the fourth side surface of the base; the substrate comprises a third portion being disposed on the third side surface of the base and a fourth portion being disposed on the fourth side surface of the base; the second coil is not disposed in the third and fourth portions of the substrate; and the first coil may comprise coils being disposed in the third portion and fourth portion of the substrate.

The camera module according to the present embodiment may comprise: a printed circuit board; an image sensor being disposed in the printed circuit board; the lens driving device being disposed in the printed circuit board; and a lens being coupled to the holder of the lens driving device.

The optical device according to the present embodiment may comprise: a main body; the camera module being disposed in the main body; and a display being disposed in the main body and outputting at least one of an image and a video captured by the camera module.

The lens driving device according to the present embodiment comprises: a base; a housing being disposed inside the base; a holder being disposed inside the housing; a first magnet being disposed in the holder; a second magnet being disposed in the housing; a substrate being disposed in the base; a first coil being disposed in the substrate and facing the first magnet; a second coil being disposed in the substrate and facing the second magnet; a first ball being in contact with the holder and the housing; and a first yoke being fixed to the housing and being overlapped with the first magnet in an optical axis direction, wherein the housing comprises an upper plate and a side plate being extended from the upper plate, wherein the first ball may be disposed between the upper surface of the holder and the upper plate of the housing, and wherein the first yoke may be fixed to the upper plate of the housing.

Advantageous Effects

Through the present embodiment, it is possible to reduce the current consumed during autofocus driving and handshake correction driving compared to the spring type.

Furthermore, autofocus driving and handshake correction driving may be possible without risk to the performance and reliability even when a lens having a large diameter is employed.

BEST MODE

Figure 1:
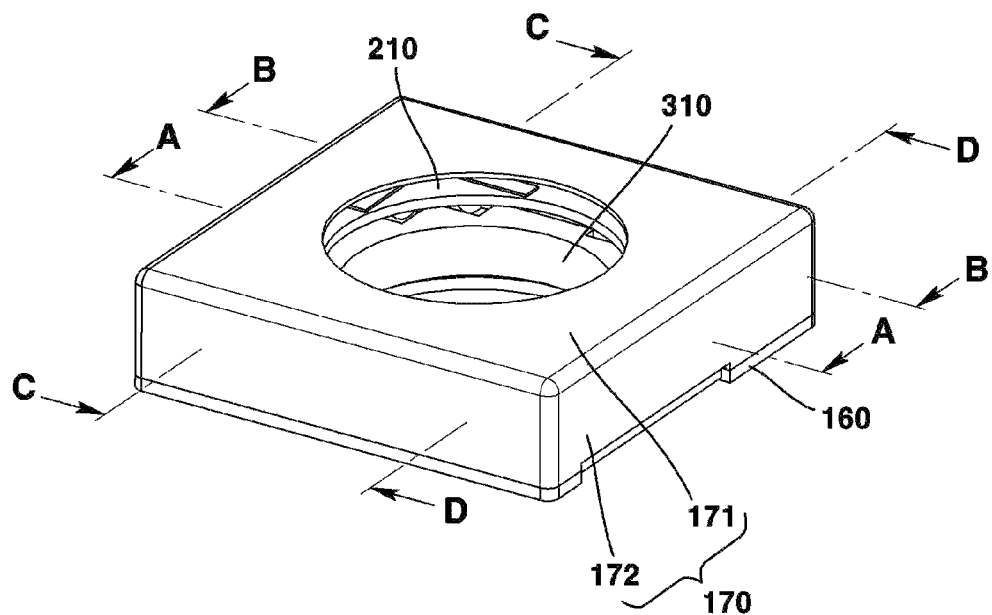
FIG. 1 is a perspective view of a lens driving device according to the present embodiment.

Hereinafter, preferred embodiments of the present invention will be described in detail with reference to the accompanying drawings.

However, the technical idea of the present invention is not limited to some embodiments to be described, but may be implemented in various forms, and within the scope of the technical idea of the present invention, one or more of the constituent elements may be selectively combined or substituted between embodiments.

In addition, the terms (comprising technical and scientific terms) used in the embodiments of the present invention, unless explicitly defined and described, can be interpreted as a meaning that can be generally understood by a person skilled in the art, and commonly used terms such as terms defined in the dictionary may be interpreted in consideration of the meaning of the context of the related technology.

In addition, terms used in the present specification are for describing embodiments and are not intended to limit the present invention.

In the present specification, the singular form may comprise the plural form unless specifically stated in the phrase, and when described as "at least one (or more than one) of A and B and C", it may comprise one or more of all combinations that can be combined with A, B, and C.

In addition, in describing the components of the embodiment of the present invention, terms such as first, second, A, B, (a), and (b) may be used. These terms are merely intended to distinguish the components from other components, and the terms do not limit the nature, order or sequence of the components.

And, when a component is described as being 'connected', 'coupled' or 'interconnected' to another component, the component is not only directly connected, coupled or interconnected to the other component, but may also comprise cases of being 'connected', 'coupled', or 'interconnected' due that another component between that other components.

In addition, when described as being formed or arranged in "on (above)" or "below (under)" of each component, "on (above)" or "below (under)" means that it comprises not only the case where the two components are directly in contact with, but also the case where one or more other components are formed or arranged between the two components. In addition, when expressed as "on (above)" or "below (under)", the meaning of not only an upward direction but also a downward direction based on one component may be comprised.

An 'optical axis direction' used hereinafter is defined as an optical axis direction of a lens and/or an image sensor being coupled to a lens driving device.

The 'vertical direction' used hereinafter may be a direction parallel to the optical axis direction. The vertical direction may correspond to the 'z-axis direction'. The 'horizontal direction' used hereinafter may be a direction perpendicular to the vertical direction. That is, the horizontal direction may be a direction perpendicular to the optical axis. Accordingly, the horizontal direction may comprise an 'x-axis direction' and a 'y-axis direction'.

The 'auto focus (AF) function' used hereinafter is defined as a function to automatically focus on a subject by adjusting the distance from the image sensor by moving the lens in an optical axis direction according to the distance of the subject so that the image sensor can obtain a clear image of the subject. Meanwhile, 'auto focus' may correspond to 'AF (auto focus)'.

The 'handshake correction function' used below is defined as a function of moving or tilting a lens in a direction perpendicular to an optical axis direction to offset vibration (movement) generated in an image sensor by an external force. Meanwhile, 'handshake correction' may be used interchangeably with ' OIS (optical image stabilization)' or 'optical image stabilization'.

Hereinafter, a lens driving device according to a present embodiment will be described with reference to drawings.

Figure 2:
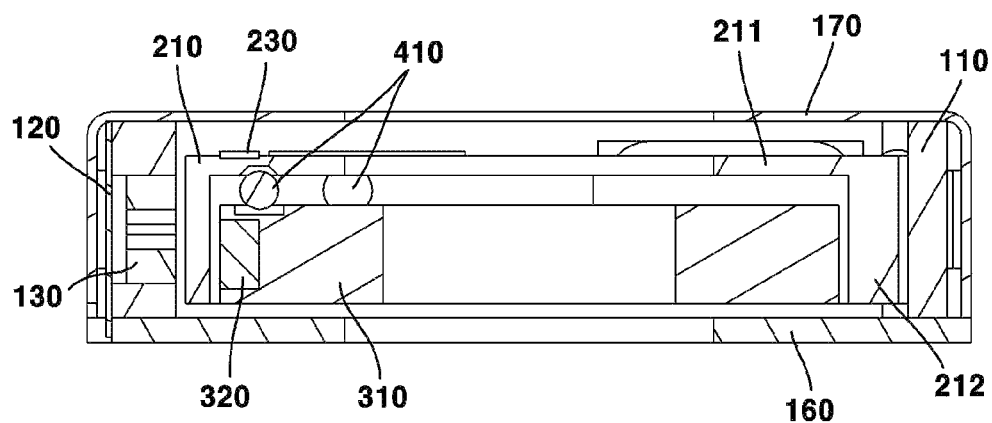
FIG. 2 is a cross-sectional view viewed from A-A in FIG. 1.
Figure 3:
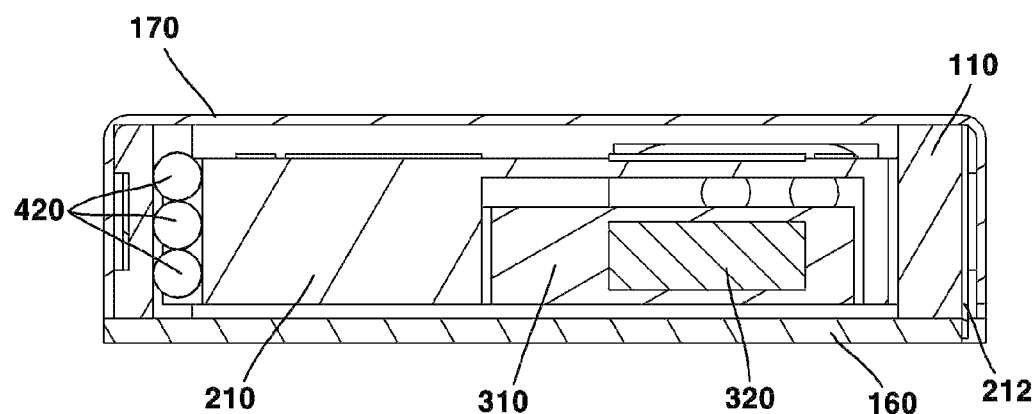
FIG. 3 is a cross-sectional view viewed from line B-B in FIG. 1.
Figure 4:
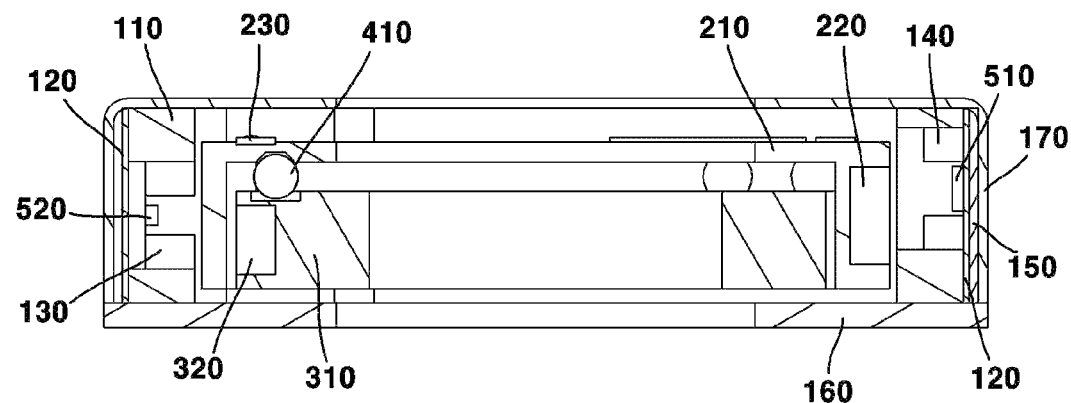
FIG. 4 is a cross-sectional view viewed from C-C in FIG. 1.
Figure 5:
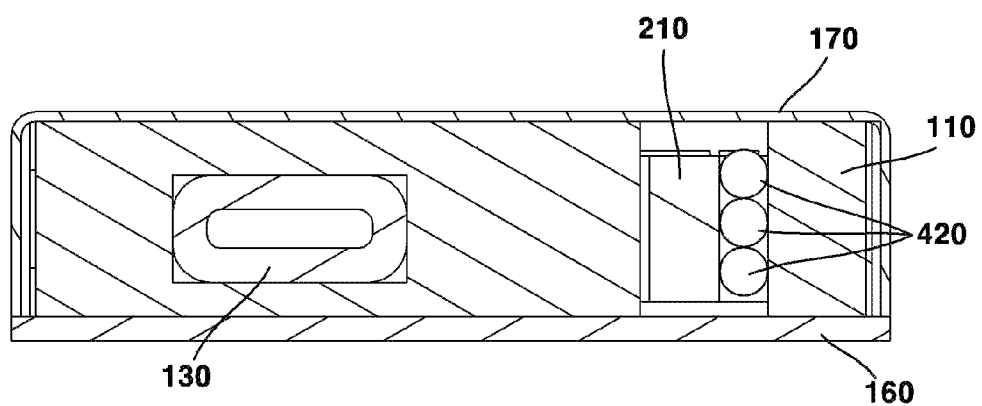
FIG. 5 is a cross-sectional view viewed from D-D in FIG. 1.
Figure 6:
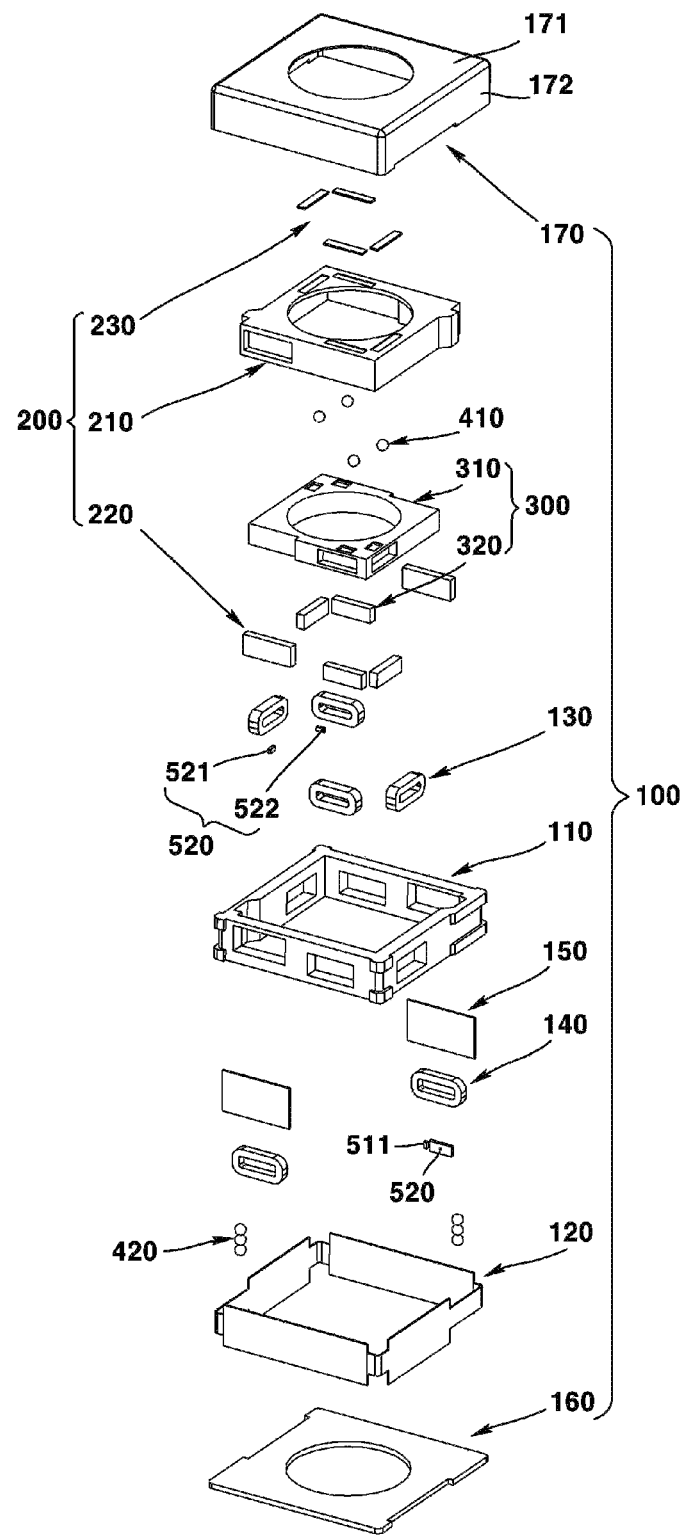
FIG. 6 is an exploded perspective view of a lens driving device according to the present embodiment.
Figure 7:
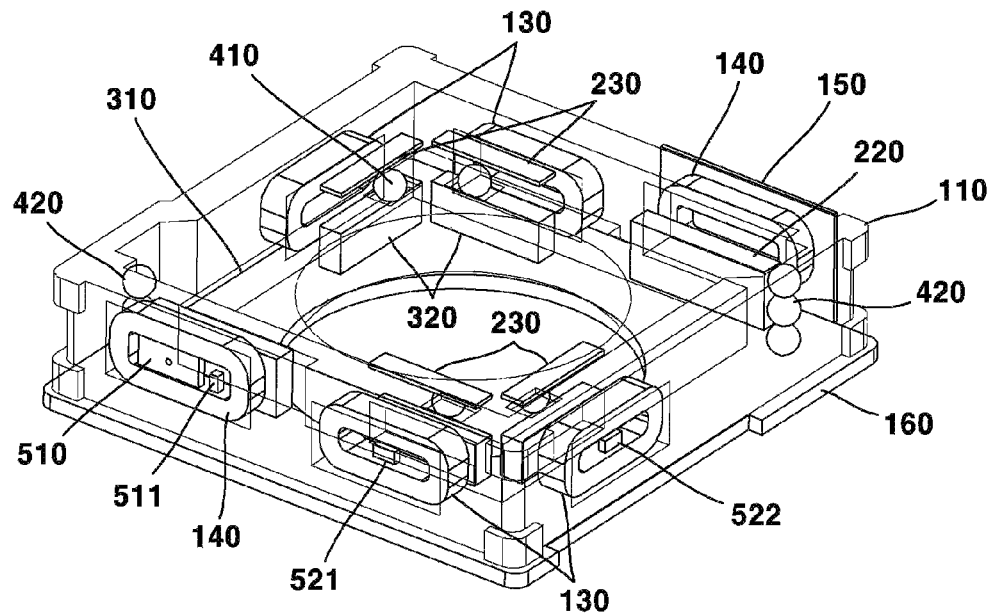
FIG. 7 is a perspective view of a part of the lens driving device according to the present embodiment.
Figure 8:
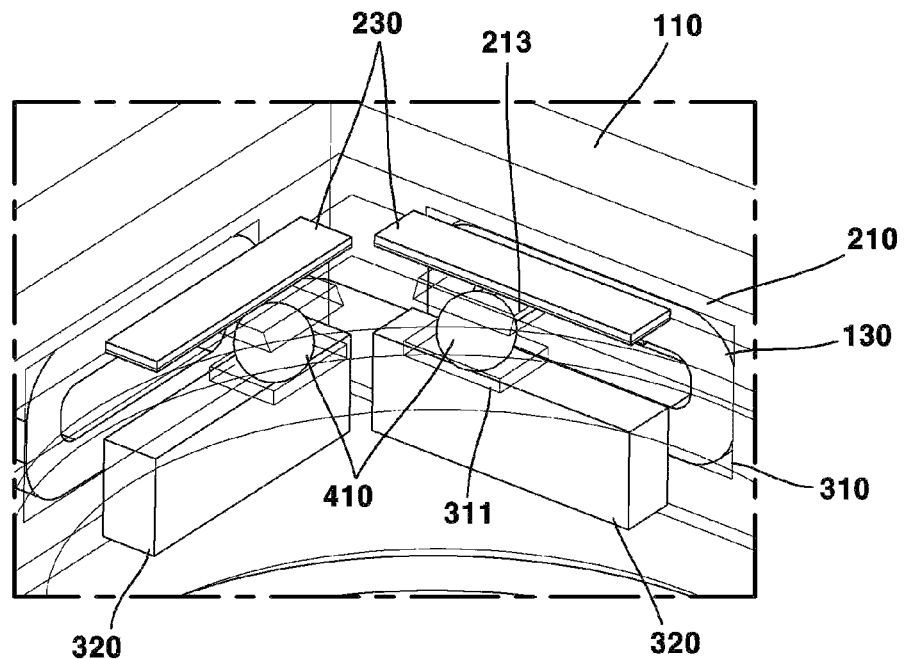
FIG. 8 is an enlarged view of a partial region of FIG. 7.
Figure 9:
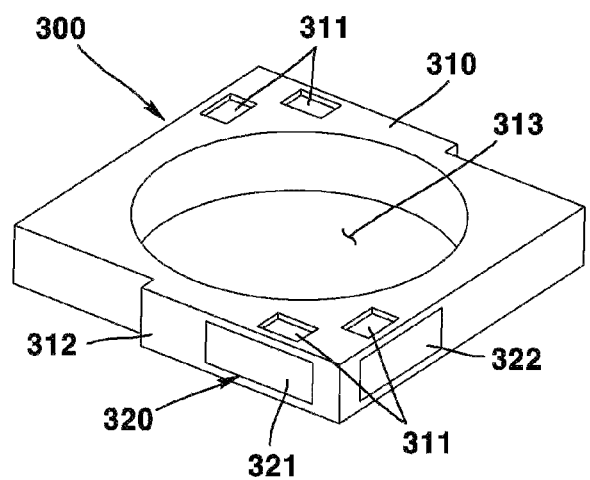
FIG. 9 is a perspective view of a second mover of a lens driving device according to the present embodiment.
Figure 10:
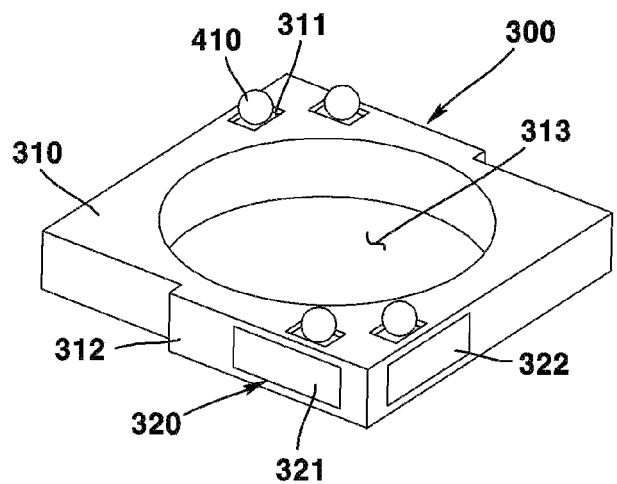
FIG. 10 is a perspective view illustrating a state in which a first ball is disposed in FIG. 9.
Figure 11:
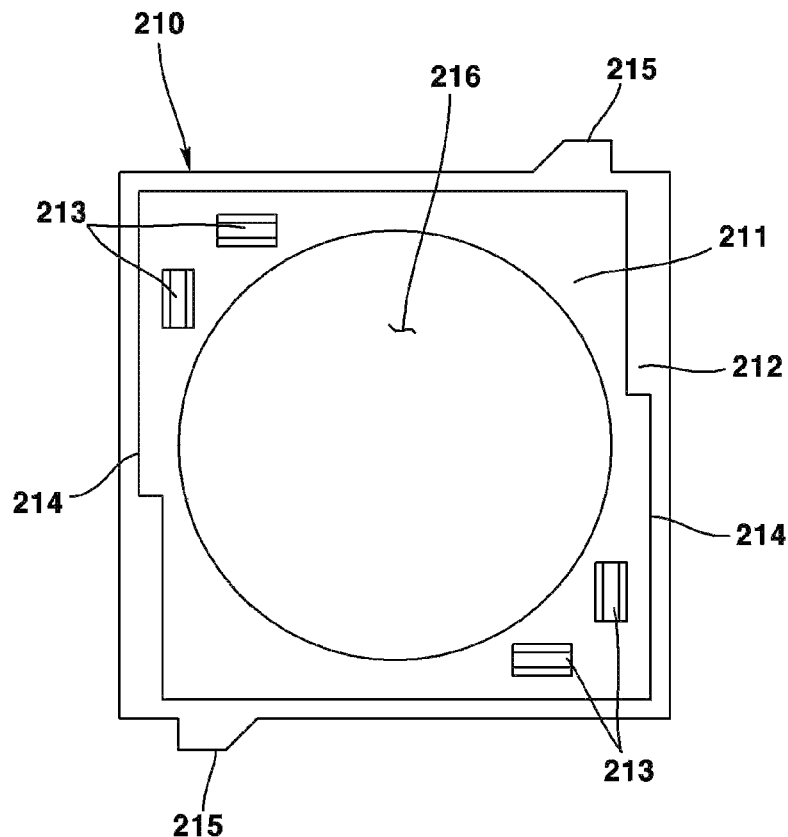
FIG. 11 is a bottom view of a housing of a lens driving device according to the present embodiment.
Figure 12:
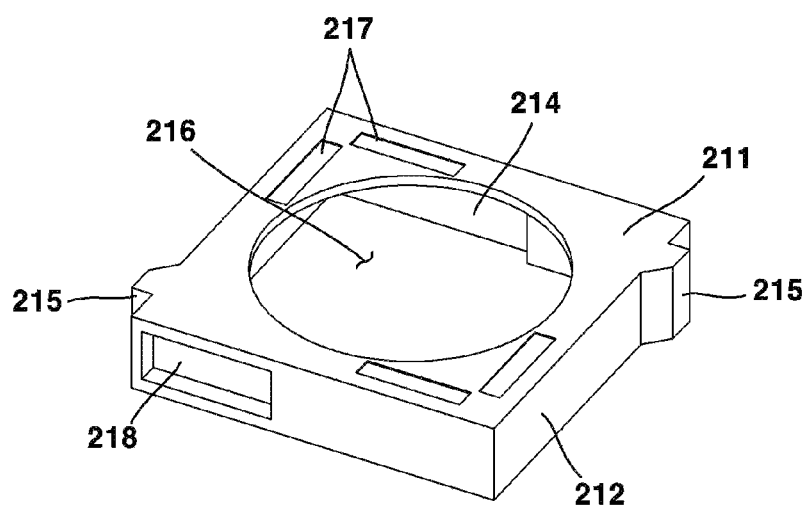
FIG. 12 is a perspective view of a housing of a lens driving device according to the present embodiment.
Figure 13:
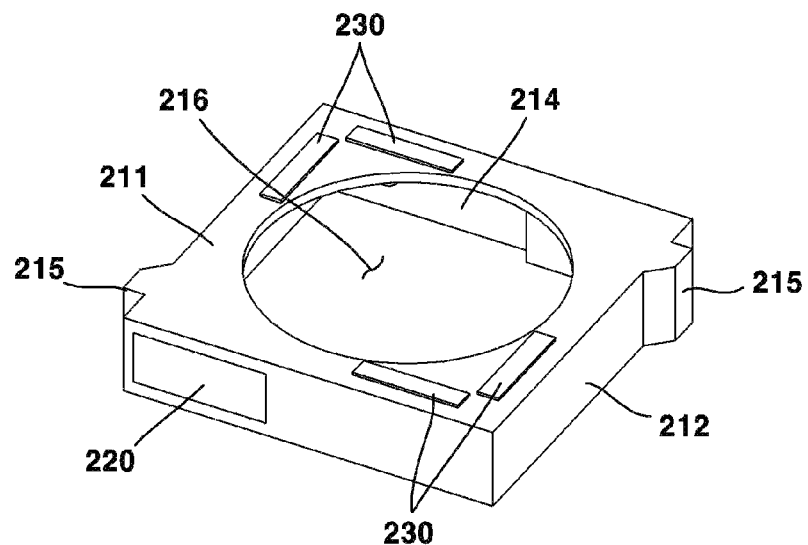
FIG. 13 is a perspective view of a first mover of a lens driving device according to the present embodiment.
Figure 14:
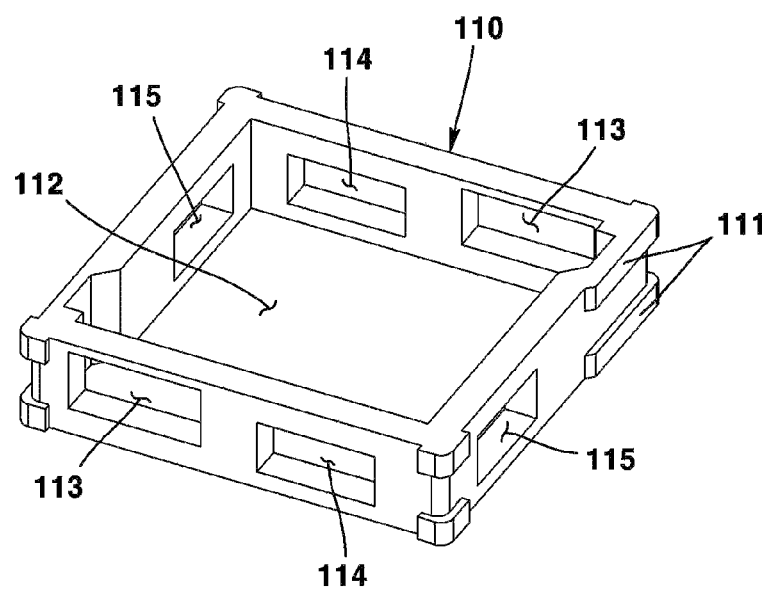
FIG. 14 is a perspective view of a first base of a lens driving device according to present embodiment.
Figure 15:
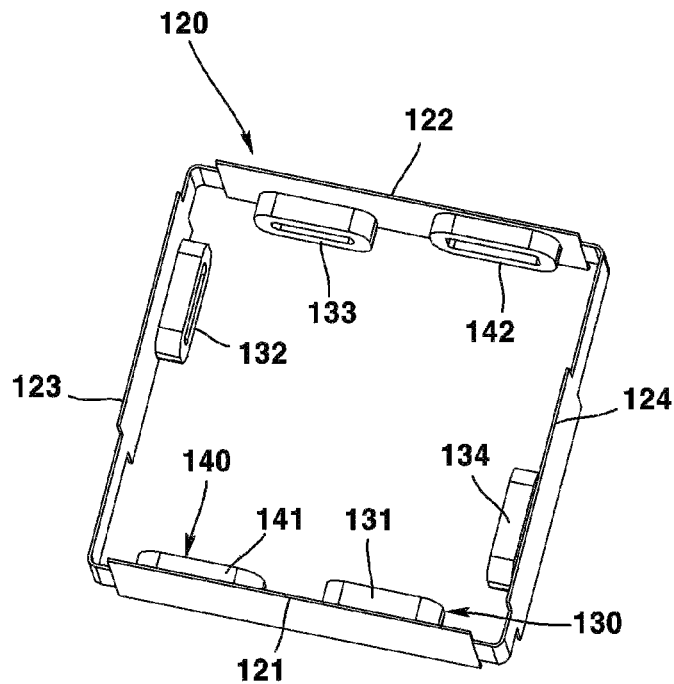
FIG. 15 is a perspective view illustrating an arrangement structure of a substrate and first and second coils of a lens driving device according to the present embodiment.
Figure 16:
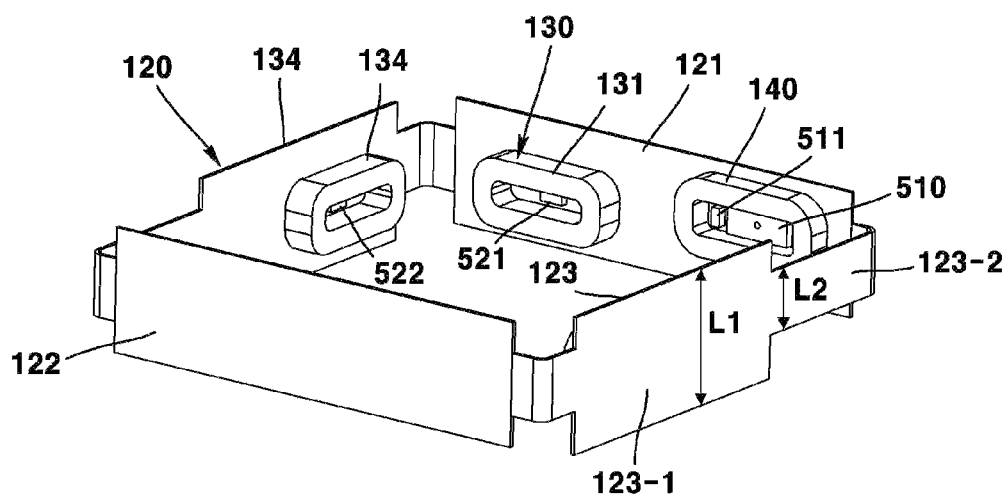
FIG. 16 is a perspective view of FIG. 15 viewed from another direction.
Figure 17:
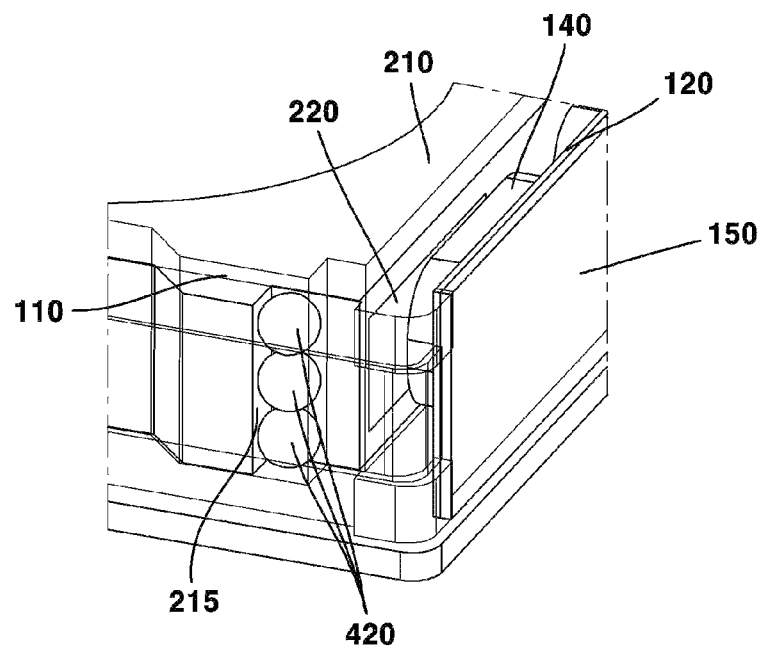
FIG. 17 is a perspective view illustrating a second ball and related configurations of a lens driving device according to a present embodiment.
Figure 18:
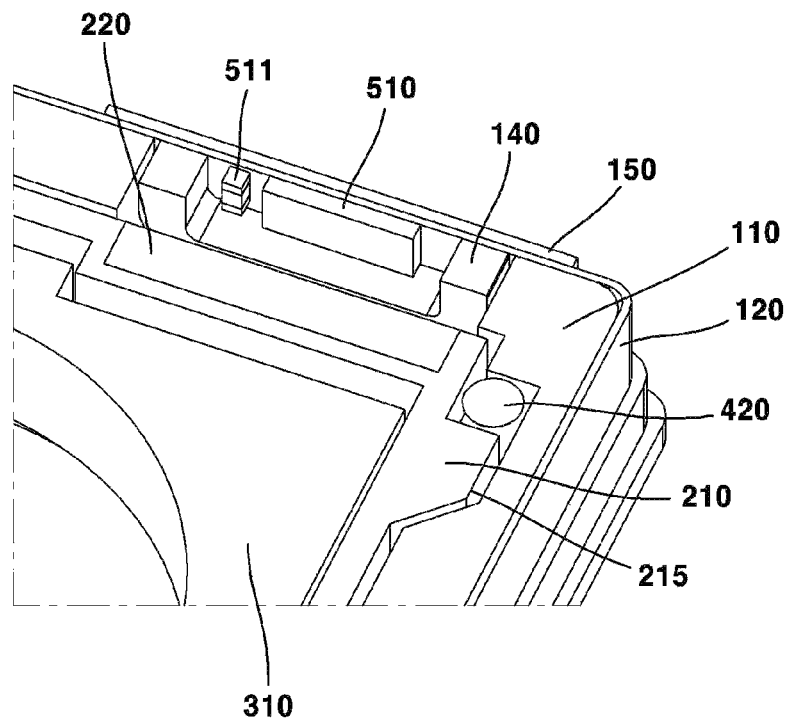
FIG. 18 is a cross-sectional view of some configurations of a lens driving device according to the present embodiment.
Figure 19:
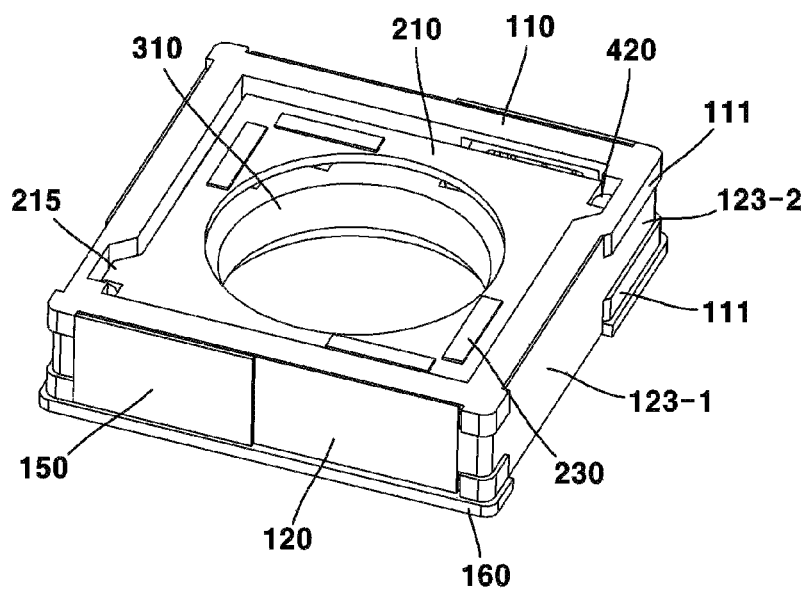
FIGS. 19 and 20 are perspective views illustrating a state in which a cover member is omitted in a lens driving device according to the present embodiment.
Figure 20:
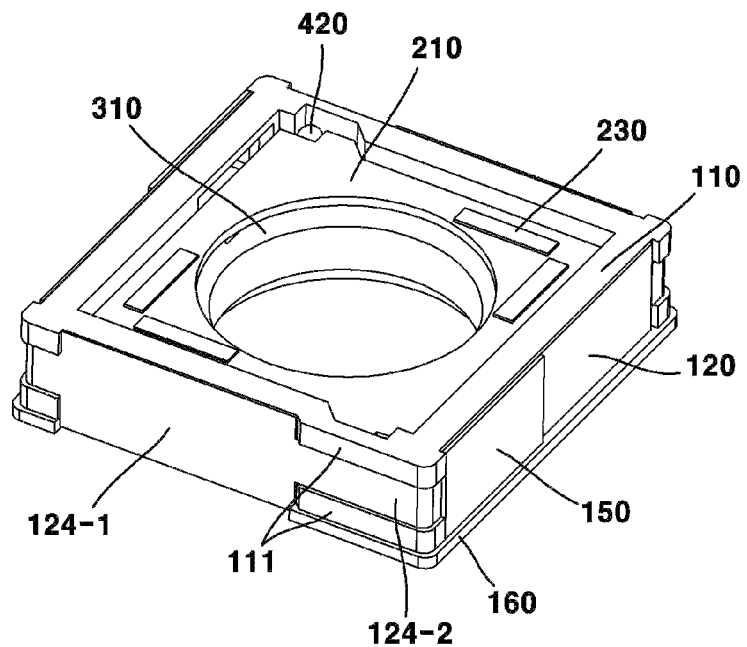
Figure 21:
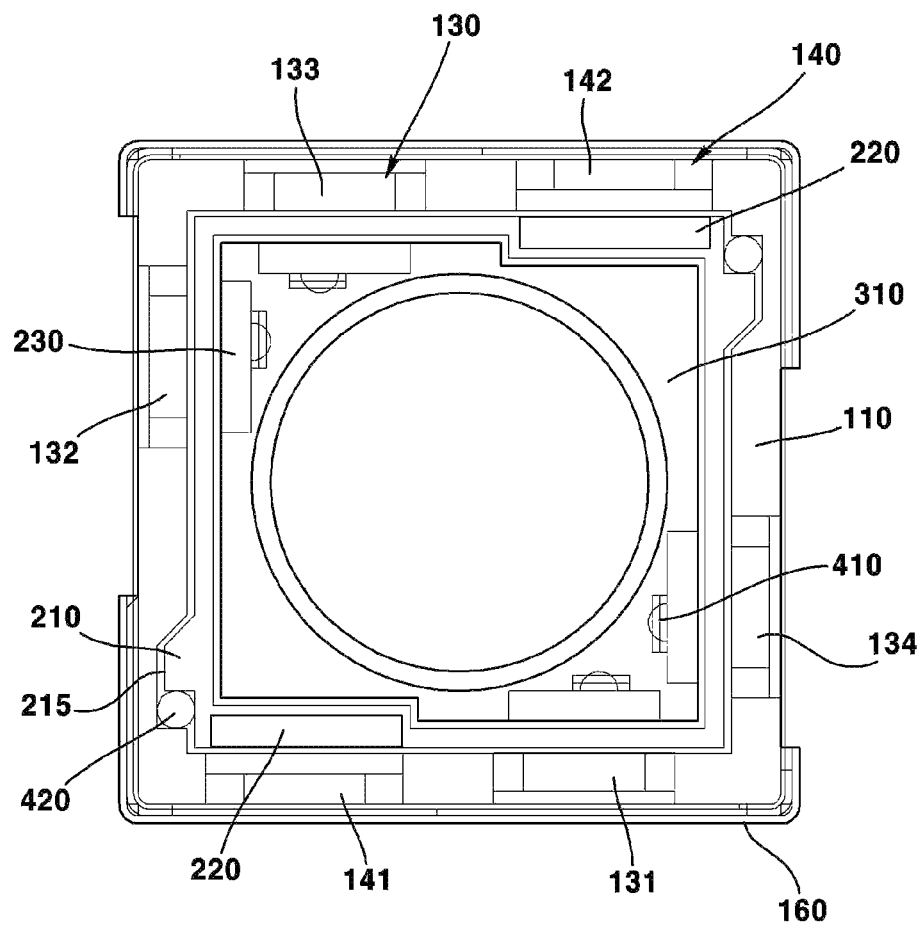
FIG. 21 is a perspective view of FIG. 19 viewed from above.
Figure 22:
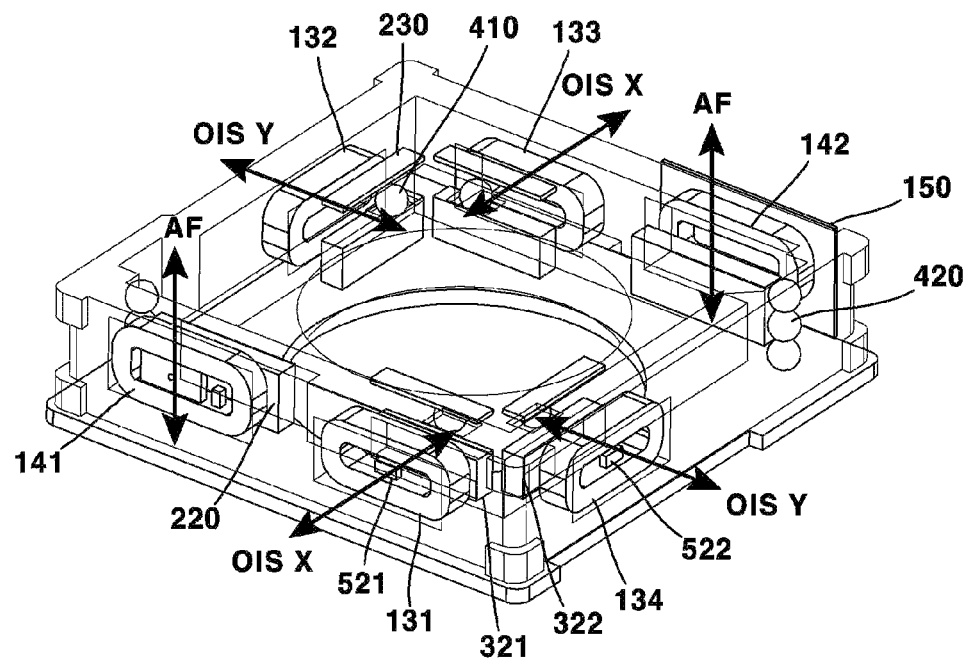
FIG. 22 is a diagram for explaining AF and OIS driving of a lens driving device according to a present embodiment.

FIG. 1 is a perspective view of a lens driving device according to the present embodiment; FIG. 2 is a cross-sectional view viewed from A-A in FIG. 1; FIG. 3 is a cross-sectional view viewed from line B-B in FIG. 1; FIG. 4 is a cross-sectional view viewed from C-C in FIG. 1; FIG. 5 is a cross-sectional view viewed from D-D in FIG. 1; FIG. 6 is an exploded perspective view of a lens driving device according to the present embodiment; FIG. 7 is a perspective view of a part of the lens driving device according to the present embodiment; FIG. 8 is an enlarged view of a partial region of FIG. 7; FIG. 9 is a perspective view of a second mover of a lens driving device according to the present embodiment; FIG. 10 is a perspective view illustrating a state in which a first ball is disposed in FIG. 9; FIG. 11 is a bottom view of a housing of a lens driving device according to the present embodiment; FIG. 12 is a perspective view of a housing of a lens driving device according to the present embodiment; FIG. 13 is a perspective view of a first mover of a lens driving device according to the present embodiment; FIG. 14 is a perspective view of a first base of a lens driving device according to present embodiment; FIG. 15 is a perspective view illustrating an arrangement structure of a substrate and first and second coils of a lens driving device according to the present embodiment; FIG. 16 is a perspective view of FIG. 15 viewed from another direction; FIG. 17 is a perspective view illustrating a second ball and related configurations of a lens driving device according to a present embodiment; FIG. 18 is a cross-sectional view of some configurations of a lens driving device according to the present embodiment; FIGS. 19 and 20 are perspective views illustrating a state in which a cover member is omitted in a lens driving device according to the present embodiment; FIG. 21 is a perspective view of FIG. 19 viewed from above; and FIG. 22 is a diagram for explaining AF and OIS driving of a lens driving device according to a present embodiment.

The lens driving device 10 may comprise a stator 100. The stator 100 may move a first mover 200 and a second mover 300. The stator 100 may accommodate the first mover 200 and the second mover 300 therein. The stator 100 may be a portion being relatively fixed when the first mover 200 and the second mover 300 move. The stator 100 may be a fixed portion.

The lens driving device 10 may comprise a base. The base may comprise a first base 110 and a second base 160. The first base 110 may be a side plate of the base and the second base 160 may be a lower plate of the base. The base may comprise four side surfaces. The base may comprise first to fourth side surfaces.

A first base 110 may be comprised. The stator 100 may comprise a first base 110. The first base 110 may be disposed outside the housing 210. A first coil 130 and a second coil 140 may be disposed in the first base 110. The first base 110 may be disposed above the second base 160.

The first base 110 may comprise a plurality of side surfaces. The first base 110 may comprise first to fourth side surfaces. The second side surface of the first base 110 may be disposed at an opposite side of the first side surface of the first base 110. The third side surface of the first base 110 may be disposed at an opposite side of the fourth side surface of the first base 110. At this time, the first to fourth side surfaces of the first base 110 may be the first to fourth side surfaces of the base.

The first base 110 may comprise a protruding portion 111. The protruding portion 111 may protrude from the third side surface of the first base 110. The protruding portion 111 may protrude from the fourth side surface of the first base 110. The protruding portion 111 may comprise two protruding portions spaced apart from each other in an optical axis direction. The protruding portion 111 may be formed on an upper portion and a lower end portion of the side surface of the first base 110. A substrate 120 may be disposed between the two protruding portions. The separation distance between the two protruding portions may correspond to the length of the substrate 120 in the corresponding direction.

The first base 110 may comprise a first hole 112. The first hole 112 may be hollow. The housing 210 may be disposed in the first hole 112. The first hole 112 may penetrate through the first base 110 in an optical axis direction.

The first base 110 may comprise a second hole 113. The second hole 113 may be formed in a position corresponding to the second coil 140. A second coil 140 may be disposed in the second hole 113. The second hole 113 may be formed in a position corresponding to the second magnet 220. The second hole 113 may penetrate through the first base 110 in a direction perpendicular to the optical axis direction.

The first base 110 may comprise a third hole 114. The third hole 114 may be formed in a position corresponding to the first-first coil 131 and the first-third coil 133. A first-first coil 131 and a first-third coil 133 may be disposed in the third hole 114. The third hole 114 may be formed in a position corresponding to the first-first magnet 321. The third hole 114 may penetrate through the first base 110 in a direction perpendicular to the optical axis direction.

The first base 110 may comprise a fourth hole 115. The fourth hole 115 may be formed in a position corresponding to the first-second coil 132 and the first-fourth coil 134. A first-second coil 132 and a first-fourth coil 134 may be disposed in the fourth hole 115. The fourth hole 115 may be formed in a position corresponding to the first-second magnet 322. The fourth hole 115 may penetrate through the first base 110 in a direction perpendicular to the optical axis direction.

The second base 160 may be disposed below the holder 310. The second base 160 may be disposed below the first base 110. The second base 160 may be disposed below the holder 310. The second base 160 may be in contact with the housing 210. A lower stopper for limiting downward movement of the housing 210 may be formed in the second base 160. A lower stopper may be formed in the housing 210 to limit downward movement of the housing 210 by being in contact with the second base 160. The lower stopper may be formed in any one or more of the housing 210 and the second base 160.

The lens driving device 10 may comprise a substrate 120. The stator 100 may comprise a substrate 120. The substrate 120 may be disposed in the base. The substrate 120 may be a flexible printed circuit board (FPCB). The substrate 120 may be formed to be flexible. The substrate 120 is integrally formed and may be bent. The substrate 120 may be disposed to surround an outer circumferential surface of the base. A first coil 130 and a second coil 140 may be disposed in the substrate 120. The substrate 120 may be electrically connected to the first coil 130 and the second coil 140. The substrate 120 may supply current to the first coil 130 and the second coil 140.

The substrate 120 may comprise a plurality of portions. The substrate 120 may comprise a plurality of portions corresponding to a plurality of side surfaces of the first base 110. The substrate 120 may comprise first to fourth portions 121, 122, 123, and 124. The substrate 120 may comprise a first portion 121 being disposed on a first side surface of the base. The substrate 120 may comprise a second portion 122 being disposed on a second side surface of the base. The substrate 120 may comprise a third portion 123 being disposed on a third side surface of the base. The substrate 120 may comprise a fourth portion 124 being disposed on a fourth side surface of the base.

The third portion 123 of the substrate 120 may comprise a first region 123-1 and a second region 123-2. The third portion 123 of the substrate 120 may comprise: a first region 123-1 in which the first coil 130 is disposed; and a second region 123-2 being extended from the first region 123-1 and disposed between the two protruding portions 111 of the first base 110. In an optical axis direction, the length of the first region 123-1 of the substrate 120 (refer to (refer to L1 in FIG. 16) may be longer than the length of the second region 123-2 of the substrate 120 (refer to L2 in FIG. 16).

The fourth portion 124 of the substrate 120 may comprise a first region 124-1 and a second region 124-2. The fourth portion 124 of the substrate 120 may comprise: a first region 124-1 in which the first coil 130 is disposed; and a second region 124-2 being extended from the first region 124-1 and disposed between the two protruding portions 111 of the first base 110. In an optical axis direction, the length of the first region 124-1 of the substrate 120 may be longer than the length of the second region 124-2 of the substrate 120.

In the present embodiment, the first coil 130 and the second coil 140 may be disposed together in a first portion 121 of the substrate 120. At this time, the first coil 130 may be disposed next to the second coil 140. The first coil 130 may be disposed at one side of the first portion 120 of the substrate 120, and the second coil 140 may be disposed at the other side of the first portion 120 of the substrate 120. In addition, the first coil 130 and the second coil 140 may be disposed together in a third portion 123 of the substrate 120. Only the first coil 130 may be disposed in a second portion 122 and a fourth portion 124 of the substrate 120. The first coil 130 and the second coil 140 may be formed in different sizes. The number of windings of the first coil 130 and the second coil 140 may be different from each other. As a modified embodiment, the first coil 130 and the second coil 140 may have the same number of turns and may be formed to have the same size.

The substrate 120 may comprise a plurality of terminals. The substrate 120 may comprise 16 terminals. The plurality of terminals of the substrate 120 may comprise four terminals being electrically connected to the driver IC 510. The plurality of terminals of the substrate 120 may comprise two terminals being electrically connected to coils being disposed on a first imaginary plane among the first coils 130. That is, the plurality of terminals of the substrate 120 may comprise two terminals being electrically connected to a first-first coil 131 and a first-third coil 133. The plurality of terminals of the substrate 120 may comprise two terminals being electrically connected to coils being disposed on an imaginary second plane perpendicular to the first plane among the first coils 130. That is, the plurality of terminals of the substrate 120 may comprise two terminals being electrically connected to a first-second coil 132 and a first-fourth coil 134. The plurality of terminals of the substrate 120 may comprise four terminals being electrically connected to a first Hall sensor 521. The plurality of terminals of the substrate 120 may comprise four terminals being electrically connected to a second Hall sensor 522.

In a modified embodiment, the substrate 120 may comprise 15 terminals. At this time, the first Hall sensor 521 and the second Hall sensor 522 use one terminal in common, so the first Hall sensor 521 and the second Hall sensor 522 may be electrically connected to seven terminals.

The lens driving device 10 may comprise a first coil 130. The stator 100 may comprise a first coil 130. The first coil 130 may be disposed in the substrate 120. The first coil 130 may face the first magnet 320. The first coil 130 may move the holder 310 in a direction perpendicular to the optical axis direction. The first coil 130 may be an OIS coil. When current is supplied to the first coil 130, an electromagnetic field may be formed around the first coil 130. Through this, the first coil 130 may interact with the first magnet 320 electromagnetically.

The first coil 130 may comprise a coil being disposed in a first portion 121 of the substrate 120. The first coil 130 may be disposed in the first portion 121 of the substrate 120. The first coil 130 may comprise a coil being disposed in the second portion 122 of the substrate 120. The first coil 130 may be disposed in the second portion 122 of the substrate 120. The first coil 130 may comprise a coil being disposed in a third portion 123 of the substrate 120. The first coil 130 may be disposed in a third portion 123 of the substrate 120. The first coil 130 may comprise a coil being disposed in a fourth portion 124 of the substrate 120. The first coil 130 may be disposed in a fourth portion 124 of the substrate 120. The first coil 130 may be disposed on a first side surface of the base 110. The first coil 130 may comprise a coil being disposed on a first side surface of the base 110.

As a modified embodiment, a first magnet 320 may be disposed on a first side surface of the base 110. At this time, the first coil 130 may be placed in the holder 310. The first magnet 320 may comprise a magnet being disposed on a first side surface of the base 110.

The first coil 130 may comprise a plurality of first coils. The first coil 130 may comprise four first coils. The four first coils may be disposed in the first to fourth portions 121, 122, 123, and 124 of the substrate 120, respectively.

The first coil 130 may comprise a first-first coil 131 and a first-third coil 133. The first-first coil 131 and the first-third coil 133 may be OIS-x coils. That is, the first-first coil 131 and the first-third coil 133 may move the holder 310 in a first direction (x-axis direction) perpendicular to the optical axis direction.

The first coil 130 may comprise a first-second coil 132 and a first-fourth coil 134. The first-second coil 132 and the first-fourth coil 134 may be OIS-y coils. That is, the first-second coil 132 and the first-fourth coil 134 may move the holder 310 in a second direction (y-axis direction) perpendicular to the optical axis direction and the first direction.

The first-first coil 131 may be a first unit coil. The first-second coil 132 may be a second unit coil. The first-third coil 133 may be a third unit coil. The first-fourth coil 134 may be a fourth unit coil.

The lens driving device 10 may comprise a second coil 140. The stator 100 may comprise a second coil 140. The second coil 140 may be disposed in the substrate 120. The second coil 140 may face the second magnet 220. The second coil 140 may move the holder 310 and the housing 210 in an optical axis direction. The second coil 140 may be an AF coil. When a current is supplied to the second coil 140, an electromagnetic field may be formed around the second coil 140. Through this, the second coil 140 may interact with the second magnet 220 electromagnetically.

The second coil 140 may comprise a coil being disposed in a first portion 121 of the substrate 120. The second coil 140 may be disposed in the first portion 121 of the substrate 120. The second coil 140 may comprise a coil being disposed in a second portion 122 of the substrate 120. The second coil 140 may be disposed in a second portion 122 of the substrate 120. The second coil 140 may not be disposed in a third portion 123 and a fourth portion 124 of the substrate 120. The second coil 140 may be disposed on a first side surface of the base 110. The second coil 140 may comprise a coil being disposed on a first side surface of the base 110.

As a modified embodiment, the second magnet 220 may be disposed on a first side surface of the base 110. At this time, the second coil 140 may be disposed in the housing 210. The second magnet 220 may comprise a magnet being disposed on a first side surface of the base 110. The second coil 140 may comprise a plurality of second coils. The second coil 140 may comprise two second coils. The second coil 140 may comprise a second-first coil 141 and a second-second coil 142. The second-first coil 141 may be disposed in a first portion 121 of the substrate 120. The second-second coil 142 may be disposed in a second portion 122 of the substrate 120.

The second-first coil 141 may be a first unit coil. The second-second coil 142 may be a second unit coil.

The lens driving device 10 may comprise a second yoke 150. The stator 100 may comprise a second yoke 150. The second yoke 150 may be formed of a magnetic material. The second yoke 150 may be disposed in the substrate 120. The second yoke 150 may be overlapped with the second magnet 220 in a direction perpendicular to the optical axis direction. The second yoke 150 may be formed of metal. An attractive force may act between the second yoke 150 and the second magnet 220. The second yoke 150 may attract the second magnet 220. The second magnet 220 may move in a direction closer to the second yoke 150. Through this, the housing 210 may press the second ball 420 toward the base. That is, by the attractive force between the second magnet 220 and the second yoke 150, the contact between the housing 210 and the second ball 420 and the contact between the base and the second ball 420 may be maintained.

The lens driving device 10 may comprise a cover member 170. The stator 100 may comprise a cover member 170. The cover member 170 may cover the first base 110. The cover member 170 may cover the base. The cover member 170 may be disposed to surround the base. The cover member 170 may be disposed to cover the substrate 120. The substrate 120 may be disposed on an inner surface of the side plate 172 of the cover member 170. The cover member 170 may comprise a 'cover can'. The cover member 170 may be a non-magnetic material. The cover member 170 may be formed of a metal. The cover member 170 may be formed of a metal plate. The cover member 170 may be connected to the ground portion of the printed circuit board 50. Through this, the cover member 170 may be grounded. The cover member 170 may block electromagnetic interference (EMI). At this time, the cover member 170 may be referred to as an 'EMI shield can'.

The cover member 170 may comprise an upper plate 171 and a side plate 172. The cover member 170 may comprise an upper plate 171 and a side plate 172 being extended from the upper plate 171. The side plate 172 of the cover member 170 may be coupled to the base. The cover member 170 may comprise an upper plate 171 comprising a hole and a side plate 172 being extended downward from an outer periphery or edge of the upper plate 171. The side plate 172 may comprise a plurality of side plates. The side plate 172 may comprise four side plates.

The lens driving device 10 may comprise a mover. The mover may comprise a first mover 200 and a second mover 300. A mover can be disposed to move relative to a fixed portion. The mover may comprise a housing 210 and a holder 310.

The lens driving device 10 may comprise a first mover 200. The first mover 200 may be disposed inside the fixed portion 100. The first mover 200 may be movably disposed inside the stator 100. The first mover 200 may move in an optical axis direction with respect to the stator 100. At this time, the second mover 300 can move together with the first mover 200. The first mover 200 may move for AF driving. The first mover 200 may be an AF mover.

The lens driving device 10 may comprise a housing 210. The first mover 200 may comprise a housing 210. Housing 210 may be disposed inside the base. The housing 210 may be disposed outside the holder 310. The housing 210 may accommodate the holder 310 therein. A second magnet 220 may be disposed in the housing 210. The housing 210 may move in an optical axis direction. The housing 210 may move during AF driving. The housing 210 is movable in a vertical direction with respect to the base 110.

The housing 210 may comprise an upper plate 211. An upper plate 211 may be disposed above the holder 310. A first ball 410 may be disposed in the upper plate 211. The first ball 410 may be in contact with the upper plate 211.

The housing 210 may comprise a side plate 212. The side plate 212 may be extended from the upper plate 211. The side plate 212 may be extended downward from an outer periphery of the upper plate 211. The side plate 212 may comprise a plurality of side plates. The side plate 212 may comprise four side plates.

The housing 210 may comprise a groove 213. The groove 213 may accommodate a portion of the first ball 410. The groove 213 may be a first ball accommodating groove. The groove 213 may be in contact with the first ball 410. The groove 213 may be formed so that the first ball 410 may not be separated. The groove 213 may be in contact with the first ball 410 at one point. Or, the groove 213 may be in contact with the first ball 410 at two points. The groove 213 may be in contact with the first ball 410 at three or more points. The groove 213 may be formed on a lower surface of the upper plate 211 of the housing 210.

The housing 210 may comprise a groove 214. The groove 214 may accommodate at least a portion of protruding portion 312 of holder 310. The groove 214 may be formed on an inner surface of the side plate 212 of the housing 210. The thickness of the side plate 212 of the housing 210 of the portion in which the groove 214 is formed may be thinner than that of the portion in which the groove 214 is not formed.

The housing 210 may comprise a protruding portion 215. The protruding portion 215 may be in contact with the second ball 420. The protruding portion 215 may protrude from an outer side surface of the housing 210. The protruding portion 215 may protrude outward from the side plate 212 of the housing 210. A second ball 420 may be disposed between the protruding portion 215 of the housing 210 and the base. The protruding portion 215 may comprise a first surface being in contact with the second ball 420. The protruding portion 215 may comprise a plurality of protruding portions. The second ball 420 may be disposed at each of a plurality of protruding portions of the housing 210. A plurality of protruding portions of the housing 210 may be symmetrically disposed with respect to an optical axis. At this time, the plurality of second balls 420 being disposed in the plurality of protruding portions may be symmetrical with respect to the optical axis. However, since the second ball 420 is movable, a non-symmetric moment may occur between the plurality of the second balls 420. A groove in which at least a portion of the second ball 420 is accommodated may be formed in the protruding portion 215. Grooves of the protruding portion 215 may be symmetrically disposed with respect to an optical axis.

The housing 210 may comprise hole 216. The hole 216 may be hollow. The hole 216 may penetrate through the housing 210 in an optical axis direction.

The housing 210 may comprise a groove 217. The groove 217 may accommodate at least a portion of the first yoke 230. The groove 217 may be formed on an upper surface of the upper plate 211 of the housing 210. The groove 217 may be formed in a size and shape corresponding to that of the first yoke 230. The depth of the groove 217 may correspond to the thickness of the first yoke 230. Or, the depth of the groove 217 may be shorter than the thickness of the first yoke 230. In this case, a portion of the first yoke 230 disposed in the groove 217 may be more protruded than the upper surface of the upper plate 211 of the housing 210.

The housing 210 may comprise a groove 218. The groove 218 may accommodate at least a portion of the second magnet 220. The groove 218 may be a second magnet accommodating groove. The groove 218 may be formed in a shape and size corresponding to that of the second magnet 220. The groove 218 may be formed by being recessed on an outer side surface of the housing 210.

The lens driving device 10 may comprise a second magnet 220. The first mover 200 may comprise a second magnet 220. The second magnet 220 may be disposed in the housing 210. The second magnet 220 may face the second coil 140. The second magnet 220 may interact with the second coil 140 electromagnetically. The second magnet 220 may be disposed on a side surface of the housing 210. The second magnet 220 may be disposed to be biased toward one corner among both corners of the side surface of the housing 210.

The second magnet 220 may comprise a magnet facing the second coil 140 being disposed in the first portion 121 of the substrate 120. The second magnet 220 may comprise a second-first magnet facing the second-first coil 141. The second magnet 220 may face the second-first coil 141. The second magnet 220 may comprise a magnet facing the first portion 121 of the substrate 120. The second magnet 220 may comprise a magnet facing the second coil 140 being disposed in the second portion 122 of the substrate 120. The second magnet 220 may comprise a second-second magnet facing the second-second coil 142. The second magnet 220 may face the second-second coil 142. The second magnet 220 may comprise a magnet facing the second portion 122 of the substrate 120.

The second magnet 220 may comprise a plurality of magnets. The second magnet 220 may comprise two magnets. The second magnet 220 may comprise two magnets respectively being disposed at two side surfaces of the housing 210 opposite to each other. The second magnet 220 may comprise a second-first magnet and a second-second magnet. The second-first magnet may be disposed on a first side surface of the housing 210 and a second-second magnet may be disposed on a second side surface at an opposite side of the first side surface of the housing 210. The second-first magnet faces the second-first coil 141 and the second-second magnet may face the second-second coil 142.

The second-first magnet may be a first unit magnet. The second-second magnet may be a second unit magnet.

The lens driving device 10 may comprise a first yoke 230. The first mover 200 may comprise a first yoke 230. The first yoke 230 may be formed of a magnetic material. The first yoke 230 may be formed of metal. The first yoke 230 may be disposed on an upper surface of the housing 210. The first yoke 230 may be overlapped with the first magnet 320 and the first ball 410 in an optical axis direction. The first yoke 230 may be formed of a metal. An attractive force may act between the first yoke 230 and the first magnet 320. The first yoke 230 may attract the first magnet 320. The first magnet 320 may move in a direction being closer to the first yoke 230. Through this, the holder 310 may press the first ball 410 toward the upper plate 211 of the housing 210. That is, by the attractive force between the first magnet 320 and the first yoke 230, the contact between the holder 310 and the first ball 410 and the contact between the housing 210 and the first ball 410 may be maintained.

In a modified embodiment, the first yoke 230 may be disposed on a lower surface of the upper plate 211 of the housing 210. In this case, the first ball 410 may move along a lower surface of the first yoke 230. At this time, to prevent attraction between the first ball 410 and the first yoke 230, the first ball 410 may be formed of a non-metal.

The lens driving device 10 may comprise a second mover 300. The second mover 300 may be disposed inside the stator 100. The second mover 300 may be movably disposed inside the first stator 100. The second mover 300 may be disposed inside the first mover 200. The second mover 300 may be movably disposed inside the first mover 200. The second mover 300 may move in a direction perpendicular to the optical axis direction with respect to the stator 100 and the first mover 200. The second mover 300 may move for OIS driving. The second mover 300 may be an OIS mover.

The lens driving device 10 may comprise a holder 310. The second mover 300 may comprise a holder 310. Holder 310 may be disposed inside the housing 210. Holder 310 may be disposed inside the base. The holder 310 may be disposed inside the cover member 170. The holder 310 may be coupled to a lens. A first magnet 320 may be disposed in the holder 310. The holder 310 may move during OIS driving. The holder 310 may move together with the housing 210 even during AF driving. The holder 310 may move in a horizontal direction with respect to the housing 210.

The holder 310 may comprise a first side surface and a second side surface being disposed at an opposite side of each other, and a third side surface and a fourth side surface being disposed at an opposite side of each other.

The holder 310 may comprise a groove 311. The groove 311 may accommodate at least a portion of the first ball 410. The groove 311 may be a first ball accommodating groove. The groove 311 may be in contact with the first ball 410. The groove 311 may be formed so that the first ball 410 may not be separated. The groove 311 may be in contact with the first ball 410 at one point. Or, the groove 311 may be in contact with the first ball 410 at two points. The groove 311 may be in contact with the first ball 410 at three or more points. The groove 311 may be formed on an upper surface of the holder 310.

The holder 310 may comprise a protruding portion 312. A first magnet 320 may be disposed in the protruding portion 312. The protruding portion 312 may protrude from an outer surface of the holder 310. A groove in which the first magnet 320 is to be disposed may be formed in the protruding portion 312. At least a portion of the protruding portion 312 may be disposed in a groove 214 formed on an inner circumferential surface of the housing 210.

The holder 310 may comprise a hole 313. The hole 313 may be hollow. A lens may be disposed in the hole 313. The groove 313 may penetrate through the holder 310 in an optical axis direction.

The lens driving device 10 may comprise a first magnet 320. The second mover 300 may comprise a first magnet 320. The first magnet 320 may be disposed in the holder 310. The first magnet 320 may face the first coil 130. The first magnet 320 may interact with the first coil 130 electromagnetically. The first magnet 320 may be disposed on a side surface of the holder 310. The first magnet 320 may be disposed being offset to one corner of a side surface of the holder 310.

The first magnet 320 may comprise a magnet facing the first coil 130 being disposed in a first portion 121 of the substrate 120. The first magnet 320 may comprise a magnet facing the first-first coil 131. The first magnet 320 may face the first-first coil 131. The first magnet 320 may comprise a magnet facing the first portion 121 of the substrate 120. The first magnet 320 may look at the first portion 121 of the substrate 120.

The first magnet 320 may comprise a plurality of first magnets. The first magnet 320 may comprise four first magnets. The first magnet 320 may comprise a first-first magnet 321 and a first-second magnet 322. The first-first magnet 321 may be an OIS-x magnet. The first-second magnet 322 may be an OIS-y magnet. The first-first magnet 321 may comprise a magnet facing the first-first coil 131 and a magnet facing the first-third coil 133. The first-second magnet 322 may comprise a magnet facing the first-second coil 132 and a magnet facing the first-fourth coil 134. The first magnet 320 may comprise four magnets respectively being disposed on four side surfaces of the holder 310.

The lens driving device 10 may comprise a first ball 410. The first ball 410 may be in contact with the holder 310 and the housing 210. The first ball 410 may be disposed between the holder 310 and the housing 210. The first ball 410 may be disposed on an upper surface of the holder 310. The first ball 410 may be in contact with a lower surface of the upper plate 211 of the housing 210. The first ball 410 may guide the holder 310 to move in a direction perpendicular to the optical axis direction with respect to the housing 210. The first ball 410 may guide OIS driving of the holder 310. The first ball 410 may be an OIS ball. The first ball 410 may be formed in a spherical shape. A metal may be disposed in any one or more of the housing 210 and the holder 310 being in contact with the first ball 410. The housing 210 and the holder 310 may be formed of an injection molding material. At this time, hacking by the first ball 410 may occur in the housing 210 and the holder 310. To improve this, a metal may be inserted into any one or more of the housing 210 and the holder 310, or a separate metal may be coupled or disposed. That is, the first ball 410 may move by being in contact with metal being disposed in the housing 210 and the holder 310.

In the present embodiment, the first ball 410 may be disposed in a one-layer structure. In other words, the ball guiding in an OIS-X direction and the ball guiding in an OIS-Y direction may be disposed on one virtual plane. Accordingly, the groove 311 of the holder 310 may be formed so that a plurality of balls being disposed on one imaginary plane may guide both the OIS-X direction and the OIS-Y direction. Similarly, the groove 213 of the housing 210 may also be formed so that a plurality of balls being disposed on one imaginary plane may guide both the OIS-X direction and the OIS-Y direction. The groove 311 of the holder 310 and the groove 213 of the housing 210 may be larger than the size of the first ball 410. As a modified embodiment, one or more of the groove 311 of the holder 310 and the groove 213 of the housing 210 may be omitted. That is, only the groove 311 of the holder 310 is formed and the groove 213 of the housing 210 may not be formed. Conversely, the groove 213 of the housing 210 may be formed and the groove 311 of the holder 310 may not be formed. Or, both the groove 311 of the holder 310 and the groove 213 of the housing 210 may be omitted.

The first ball 410 may comprise a plurality of first balls. The first ball 410 may comprise four balls. At this time, an imaginary plane connecting the centers of the four balls may be perpendicular to the direction of an optical axis. The plurality of first balls may have the same size as each other.

The lens driving device 10 may comprise a second ball 420. The second ball 420 may be in contact with the housing 210 and the base. The second ball 420 may be disposed between the housing 210 and the base. The second ball 420 may be disposed in the protruding portion 215 of the housing 210. The housing 210 may comprise a groove being formed in the protruding portion 215 to accommodate at least a portion of the second ball 420. The second ball 420 may be disposed in the base. The base may comprise a groove accommodating at least a portion of the second ball 420. The second ball 420 may guide the housing 210 to move in an optical axis direction with respect to the base. The second ball 420 may guide AF driving of the housing 210. The second ball 420 may be an AF ball. The second ball 420 may be formed in a spherical shape.

The second ball 420 may comprise a plurality of second balls. The second ball 420 may comprise two balls being disposed symmetrically with respect to an optical axis. The second ball 420 may comprise 6 balls. At this time, the second balls 420 may be disposed in a diagonal corner region by three in a corner region at one side. An imaginary plane connecting the plurality of second balls may have an optical axis or may be parallel to the optical axis.

The lens driving device 10 may comprise a driver IC 510. The driver IC 510 may comprise a Hall element that detects the second magnet 220. The Hall element may detect the second magnet 220. The Hall element can detect the magnetic force of the second magnet 220. The Hall element may detect any one or more of the position and movement of the second magnet 220. The Hall element may detect any one or more of positions and movement amounts of the housing 210 and the holder 310 in an optical axis direction. A value detected by the Hall element may be used for feedback of AF driving.

A driver IC 510 may be disposed in the substrate 120. The driver IC 510 may be disposed in a first portion 121 of the substrate 120. The driver IC 510 may be electrically connected to the second coil 140. The driver IC 500 may control the current applied to the second coil 140. The driver IC 500 may provide current to the second coil 140.

The lens driving device 10 may comprise a capacitor 511. The capacitor 511 may be provided in case a large voltage is applied to the driver IC 500 or the voltage suddenly drops. The capacitor 511 may be connected to an external power source. External power may enter the driver IC 500 through the capacitor 511. At this time, capacitor 511 and driver IC 500 may be connected in series.

The lens driving device 10 may comprise a Hall sensor 520. Hall sensor 520 may be disposed in substrate 120. The Hall sensor 520 may detect the first magnet 320. The Hall sensor 520 may detect the magnetic force of the first magnet 320. The Hall sensor 520 may detect any one or more of the position and movement of the first magnet 320.

The Hall sensor 520 may comprise a plurality of Hall sensors. The Hall sensor 520 may comprise two Hall sensors. Through this, the Hall sensor 520 may detect at least one of a position and a movement amount in two axis directions (x-axis and y-axis) perpendicular to the optical axis direction of the housing 210. A value detected by the Hall sensor 520 may be used for feedback of OIS driving.

The Hall sensor 520 may comprise a first Hall sensor 521 and a second Hall sensor 522. The Hall sensor 520 may comprise a first Hall sensor 521 detecting the movement of the holder 310 in a first direction perpendicular to the optical axis direction. The Hall sensor 520 may comprise a second Hall sensor 522 detecting the movement of the holder 310 in an optical axis direction and in a second direction perpendicular to the first direction.

In the present embodiment, the lens driving device 10 may comprise a driving unit. The driving unit may comprise a coil and a magnet for moving the holder 310. The driving unit may comprise a first driving unit and a second driving unit. The first driving unit may move the holder 310. The first driving unit may move the housing 210. The first driving unit may comprise a first coil 130 and a first magnet 320. The second driving unit may move the holder 310 and the housing 210 together. The second driving unit may comprise a second coil 140 and a second magnet 220.

At least a portion of the first driving unit and at least a portion of the second driving unit may be disposed on a first side surface of the base 110. Each of the first driving unit and the second driving unit may be disposed at two side surfaces facing each other among the four side surfaces of the base 110. The second driving unit may be disposed at the remaining two side surfaces of the base 110. The first driving unit may be disposed at two side surfaces facing each other among the four side surfaces of the base 110. The second driving unit may be disposed at four side surfaces of the base 110.

The present embodiment may comprise an AF structure in which the AF driving unit is supported in a diagonal direction, the AF driving unit and the fixed portion are attached to each other by attraction between each yoke and a magnet, and a plurality of balls are positioned therebetween. Here, the AF driving unit may be the first mover 200 and the fixed portion may be the stator 100.

The present embodiment may comprise a structure in which the shaking is corrected by driving a magnet, in which the holder 310 is located inside the AF driving unit and positioned on an inner side of the AF driving unit and positioned in a diagonal direction, and a coil facing them in a direction perpendicular to the optical axis. At this time, in the OIS driving unit, an attractive force is generated between one or more yokes located on the upper side surface of the housing 210 and a magnet facing them, and a ball may be located between them. Furthermore, the present embodiment may comprise a structure in which a plurality of grooves is formed on a same surface in each direction so as to be moved in X/Y directions.

The first driving unit may move the housing 210. The second driving unit may move the holder 310. A portion of the first driving unit may be disposed on a first side surface and a third side surface of the base 110 facing each other. The second driving unit may comprise a first unit driving unit partially disposed on a first side surface of the base 110 and a second unit driving unit partially disposed on a fourth side surface of the base 110. The first unit driving unit and the second unit driving unit may move the holder 310 in different directions. Another portion of the first driving unit may be disposed on a third side surface of the base 110. Another portion of the second unit driving unit may be disposed on a second side surface facing the fourth side surface of the base 110. The first unit driving unit being disposed on a first side surface and a third side surface of the base 110 may be a first unit coil. There are at least two first unit coils, one of which may be disposed on a first side surface, and the other one may be disposed on a third side surface. A first unit magnet being disposed to correspond to the first unit coil may be comprised. The first unit magnet is at least two, and may be coupled to the holder 310. The first driving unit being disposed on a first side surface and a third side surface of the base 110 may be a first coil 130. The first driving unit may comprise a first magnet 320 corresponding to the first coil 130 and coupled to the housing 210.

The second driving unit may comprise a second coil 140 and a second magnet 220. The second coil 140 may comprise a first unit coil and a second unit coil. The first unit driving unit may comprise a first unit coil and a first unit magnet. The second magnet 220 may comprise a first unit magnet and a second unit magnet. The second unit driving unit may comprise a second unit coil and a second unit magnet. The first driving unit may comprise a first coil 130 and a first magnet 320.

The driving unit may comprise: a first unit driving unit comprising a first unit coil or a first unit magnet being disposed on a first side surface of the base 110; and a second unit driving unit comprising a second unit coil or a second unit magnet being disposed on a fourth side surface of the base 110. The first unit driving unit and the second unit driving unit may move the holder 310 in different directions. Base 110 may comprise: a first corner (or edge) where the first side surface and the fourth side surface meet; and a fourth corner where the third side surface and the fourth side surface meet. Each of the first unit coil and the second unit coil may be plural. One of the plurality of first unit coils and one second unit coil may be disposed closer to the first corner than to the fourth corner. The base 110 may comprise a third corner in a direction diagonal to the first corner. Another first unit coil and another second unit coil among the plurality thereof may be disposed closer to the third corner than to the fourth corner.

The lens driving device 10 according to the present embodiment may follow the process sequence in which the OIS unit is assembled and then the base and the cover member 170 are assembled.

In the present embodiment, a ball guide structure for AF driving may be located in a diagonal direction. The ball may be brought into close contact with the ball guide unit by the attractive force between a moving magnet and a yoke. It may comprise a structure in which attraction acts in two directions and the ball is being driven in close contact.

In the present embodiment, OIS driving may be performed while the OIS driving magnet is brought into close contact with the ball by the attraction of the magnetic yoke located on the upper side of the housing 210. It may be formed in a way that the ball guide grooves being positioned between the inner ceiling surface of the housing 210 and an upper surface of the holder 310 and configured on the same plane can be moved in a direction perpendicular to each other.

In the present embodiment, a plurality of OIS magnets and coils may be disposed in a diagonal direction.

In the present embodiment, when a forward current is applied to the second coil 140, the second magnet 220 may move upward along an optical axis (z-axis) by the electromagnetic interaction between the second coil 140 and the second magnet 220. At this time, the housing 210 and the holder 310 may move upward together with the second magnet 220 (refer to AF of FIG. 22).

When a reverse current is applied to the second coil 140, the second magnet 220 may move downward along an optical axis by the electromagnetic interaction between the second coil 140 and the second magnet 220. At this time, the housing 210 and the holder 310 may move downward together with the second magnet 220 (refer to AF of FIG. 22).

When current is applied to the first-first coil 131 and the first-third coil 133, by the electromagnetic interaction between the first-first coil 131, the first-third coil 133, and the first-first magnet 321, the first-first magnet 321 may move in a first direction (x-axis direction) perpendicular to the optical axis direction. At this time, the holder 310 may also move in the first direction together with the first-first magnet 321 (refer to OIS X in FIG. 22). However, when a current is applied to the first-first coil 131, the holder 310 moves to one side of an x-axis, and when a current is applied to the first-third coil 133, the holder 310 may be controlled to move to the other side of an x-axis. Or, when a forward current is applied to the first-first coil 131 and the first-third coil 133, the holder 310 moves to one side of an x-axis, and when a reverse current is applied to the first-first coil 131 and the first-third coil 133, the holder 310 may be controlled to move to the other side of an x-axis. The first-first coil 131 and the first-third coil 133 may be electrically separated and controlled. Or, the first-first coil 131 and the first-third coil 133 may be electrically connected.

When a current is applied to the first-second coil 132 and the first-fourth coil 134, by the electromagnetic interaction between the first-second coil 132, the first-fourth coil 134, and the first-second magnet 322, the first-second magnet 322 may move in a second direction (y-axis direction) perpendicular to the optical axis direction and the first direction. At this time, the holder 310 may also move in a second direction together with the first-second magnet 322 (refer to OIS Y in FIG. 22). However, when a current is applied to the first-second coil 132, the holder 310 moves to one side of a y-axis; and when a current is applied to the first-fourth coil 134, the holder 310 may be controlled to move to the other side of a y-axis. Or, when a forward current is applied to the first-second coil 132 and the first-fourth coil 134, the holder 310 moves to one side of a y-axis; and when a reverse current is applied to the first-second coil 132 and the first-fourth coil 134, the holder 310 may be controlled to move to the other side of a y-axis. The first-second coil 132 and the first-fourth coil 134 may be electrically separated and controlled. Or, the first-second coil 132 and the first-fourth coil 134 may be electrically connected.

Hereinafter, a camera module according to a modified embodiment will be described with reference to drawings.

Figure 23:
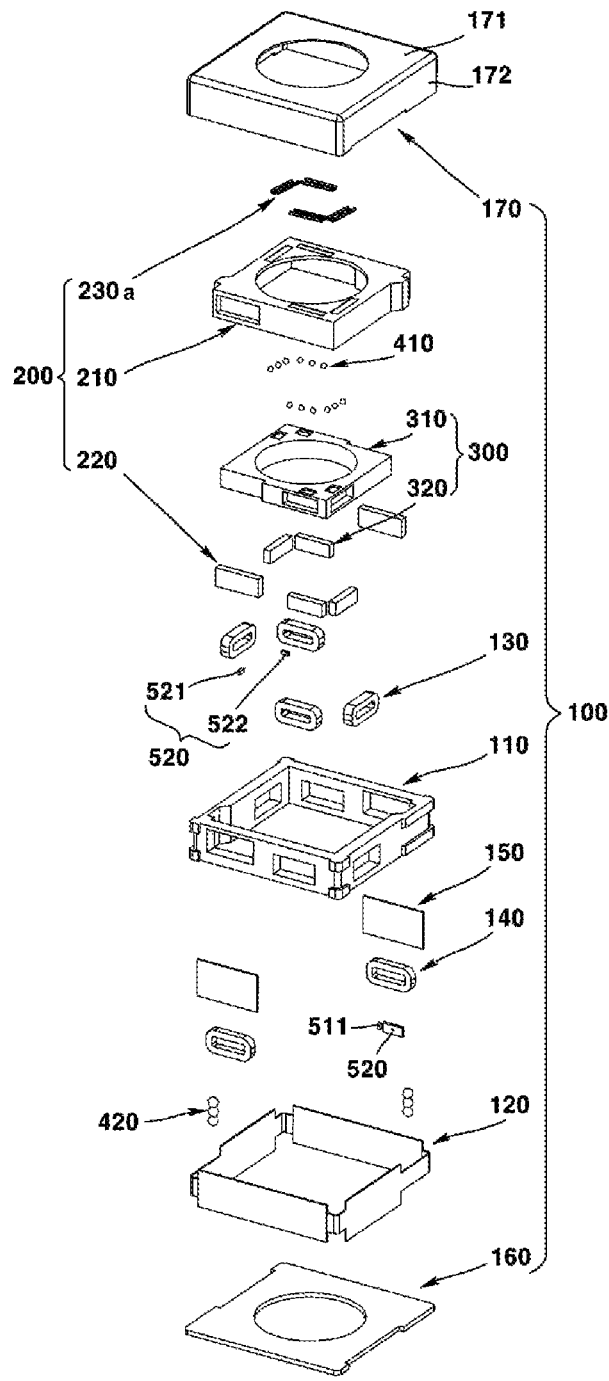
FIG. 23 is an exploded perspective view of a lens driving device according to a modified embodiment.
Figure 24:
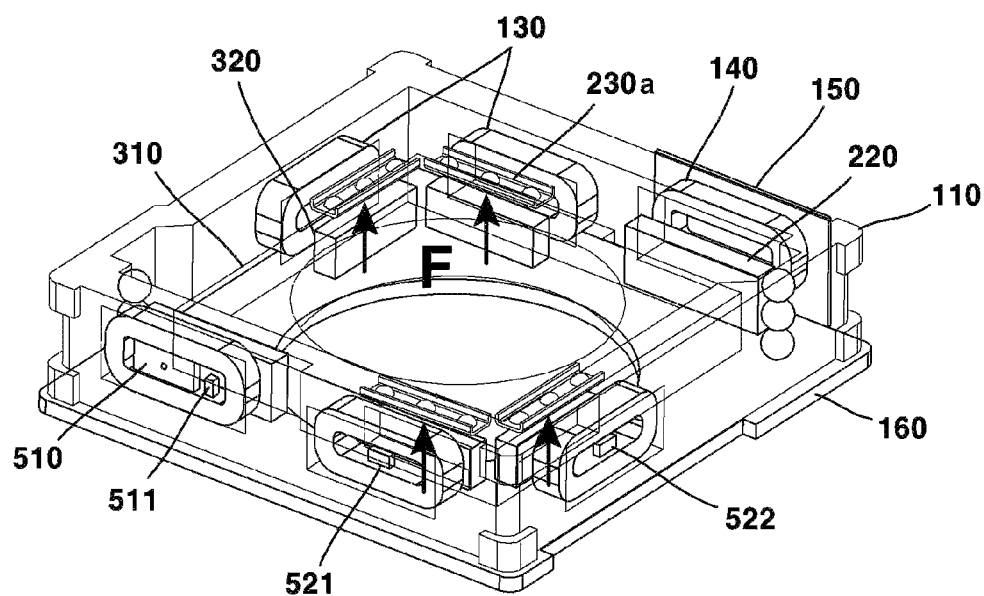
FIG. 24 is a perspective view of a partial configuration of a lens driving device according to a modified embodiment.
Figure 25:
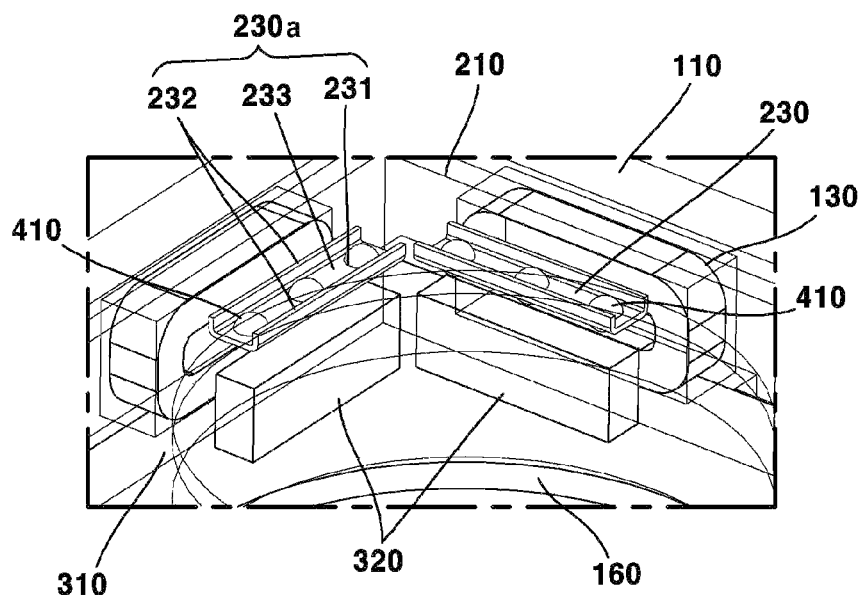
FIG. 25 is an enlarged view of a partial region of FIG. 24.
Figure 26:
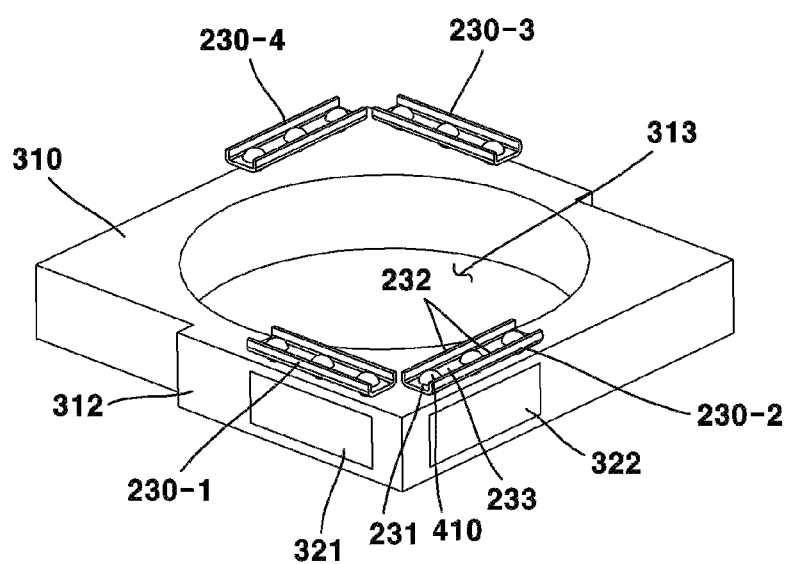
FIG. 26 is a perspective view of a partial configuration of a lens driving device according to a modified embodiment.

FIG. 23 is an exploded perspective view of a lens driving device according to a modified embodiment; FIG. 24 is a perspective view of a partial configuration of a lens driving device according to a modified embodiment; FIG. 25 is an enlarged view of a partial region of FIG. 24; and FIG. 26 is a perspective view of a partial configuration of a lens driving device according to a modified embodiment.

Hereinafter, the configuration of a camera module according to a modified embodiment will be described focusing on differences from the camera module according to the present embodiment. A description of a corresponding configuration of a camera module according to a present embodiment may be analogously applied to configurations not described below.

The lens driving device 10 may comprise a guide part. The guide part may be disposed between the holder 310 and the housing 210. The guide part may comprise a retainer (first yoke 230a) comprising a hole 231 and a first ball 410 being disposed in the hole 231. The guide part may be disposed to be overlapped with the holder 310 and the housing 210 in an optical axis direction. The retainer may be coupled to the holder 310 or the housing 210. The first ball 410 may move or roll in a direction perpendicular to the optical axis direction. The retainer may function as a yoke. The retainer may be magnetic. The retainer may comprise magnetism. An attractive force may act between the retainer and the first magnet 320.

The lens driving device 10 may comprise a first yoke 230a. The first yoke 230a may be a 'retainer'. The first mover 200 may comprise a first yoke 230a. The first yoke 230a may be formed of a magnetic material. The first yoke 230a may be formed of a metal. The first yoke 230a may be fixed to the housing 210. The first yoke 230a may be coupled to the housing 210. The first yoke 230a may be disposed below the upper plate 211 of the housing 210. The first yoke 230a may be disposed on a lower surface of the upper plate 211 of the housing 210. The first yoke 230a may be fixed to a lower surface of the upper plate 211 of the housing 210. The first yoke 230a may be disposed closer to one of the two corner regions of the upper surface of the holder 310. The first yoke 230a may be overlapped with the first magnet 320 in an optical axis direction. The first yoke 230a may be formed of a metal. An attractive force may act between the first yoke 230a and the first magnet 320. The first yoke 230a may attract the first magnet 320. The first magnet 320 may move in a direction closer to the first yoke 230a. Through this, the holder 310 may press the first ball 410 toward the upper plate 211 of the housing 210. That is, by the attractive force between the first magnet 320 and the first yoke 230a, the contact between the holder 310 and the first ball 410 and the contact between the housing 210 and the first ball 410 may be maintained.

In the present embodiment, the cross section of the first yoke 230a may be formed approximately in the shape of a letter U or a rotated letter "⊏". At this time, both ends of the first yoke 230a may be coupled to the housing 210. As a modified embodiment, the cross section of the first yoke 230a may be formed approximately in the shape of an inverted U. At this time, both ends of the first yoke 230a may be coupled to the holder 310.

In the present embodiment, the first magnet 320 comprises: a first-first magnet 321 being disposed on a first side surface of the holder 310; a first-second magnet 322 being disposed on a second side surface of the holder 310; a first-third magnet 323 being disposed on a third side surface of the holder 310; and a first-fourth magnet 324 being disposed on a fourth side surface of the holder 310.

The first-first magnet 321 may be a first unit magnet. The first-second magnet 322 may be a second unit magnet. The first-third magnet 323 may be a third unit magnet. The first-fourth magnet 324 may be a fourth unit magnet.

At this time, the first yoke 230a may comprise: a first-first yoke 230-1 being overlapped with the first-first magnet 321 in an optical axis direction; a first-second yoke 230-2 being overlapped with the first-second magnet 322 in an optical axis direction; a first-third yoke 230-3 being overlapped with the first-third magnet 323 in an optical axis direction; and a first-fourth yoke 230-4 being overlapped with the first-fourth magnet 324 in an optical axis direction. The first yoke 230a may comprise a plurality of first yokes. The first yoke 230a may comprise four first yokes.

The first yoke 230a may comprise a hole 231. A first ball 410 may be disposed in the hole 231 of the first yoke 230a. A first ball 410 may be rotatably disposed in the hole 231 of the first yoke 230a. The diameter of the hole 231 of the first yoke 230a may correspond to the diameter of the first ball 410 or may be larger than the diameter of the first ball 410. The hole 231 of the first yoke 230a may be formed in the connection plate 233. Three holes 231 of the first yoke 230a may be formed at equal intervals in each of the first-first to first-fourth yokes 230-1, 230-2, 230-3, and 230-4.

The first yoke 230a may comprise a side plate 232 and a connection plate 233. The first yoke 230a may comprise two side plates 232 in which an upper ends are being fixed to the housing 210. The first yoke 230a may comprise a connection plate 233 connecting the two side plates 232 to each other.

The connection plate 233 of the first yoke 230a may be overlapped with the center of the first ball 410 in a direction perpendicular to the optical axis direction.

In the present embodiment, the first ball 410 may be rotatably disposed in the hole 231 of the first yoke 230a.

The guide part may comprise a retainer comprising a first ball, a second ball, a first hole accommodating the first ball, and a second hole accommodating the second ball. The first ball may rotate in the first hole, and the second ball may rotate in the second hole. The second driving unit may comprise: a first unit driving unit for driving the holder 310 in a first direction by the first ball and the second ball; and a second unit driving unit for driving the holder 310 in a second direction different from the first direction by the first ball and the second ball. The first ball and the second ball may be spaced apart by the first hole and the second hole. The distance between the first ball and the second ball may be greater than or equal to the distance between the first hole and the second hole. Or, when the diameters of the first ball and the second ball are larger than the diameters of the balls, the distance between the first ball and the second ball may be smaller than the distance between the first hole and the second hole.

Hereinafter, a camera module according to a present embodiment will be described with reference to drawings.

Figure 27:
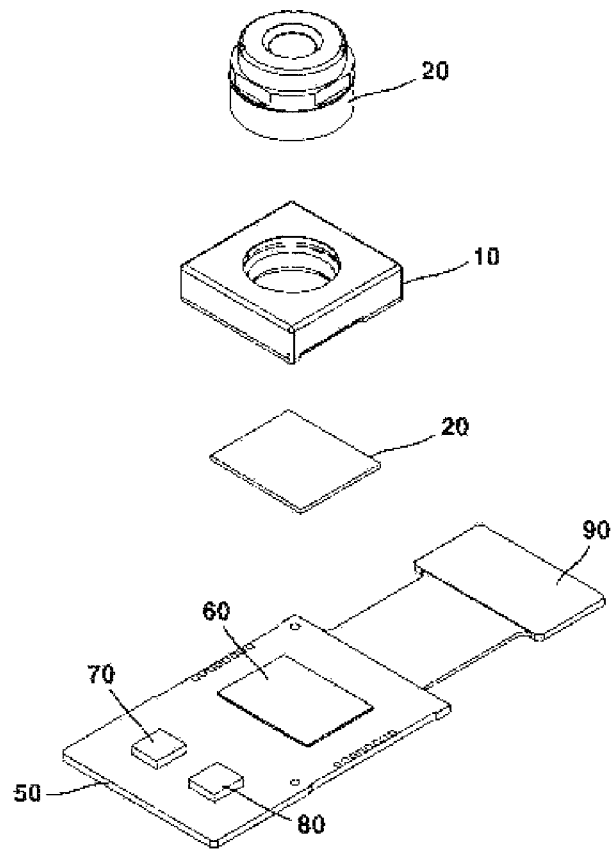
FIG. 27 is an exploded perspective view of a camera module according to the present embodiment.

FIG. 27 is an exploded perspective view of a camera module according to the present embodiment.

The camera module may be a camera device.

The camera module may comprise a lens module 20. The lens module 20 may comprise at least one lens. The lens may be disposed in a position corresponding to the image sensor 60. The lens module 20 may comprise a lens and a barrel. The lens module may be coupled to the bobbin 210 of the lens driving device 10. The lens module 20 may be coupled to the bobbin 210 by screw-coupling and/or adhesive. The lens module may move integrally with the bobbin 210.

The camera module may comprise a filter 30. The filter 30 may serve to block the light of a specific frequency band from entering the image sensor 60 among the light passing through the lens module 20. The filter 30 may be disposed parallel to an x-y plane. The filter 30 may be disposed between the lens module 20 and the image sensor A filter 30 may be disposed in the sensor base. The filter 30 may comprise an infrared filter. The infrared filter may block the light of an infrared region from being incident on the image sensor 60. The infrared filter may comprise an infrared reflection filter or an infrared absorption filter.

The camera module may comprise a sensor base. The sensor base may be disposed between the lens driving device 10 and the printed circuit board 50. The sensor base may comprise a protruding portion at which the filter 30 is disposed. An opening may be formed in a portion of the sensor base where the filter 30 is disposed so that the light passing through the filter 30 may be incident on the image sensor 60. An adhesive member may be disposed between the sensor base and the lens driving device 10. The adhesive member may attach the lens driving device 10 to an upper surface of the sensor base. The adhesive member may be configured to prevent foreign substances from entering into the lens driving device 10. The adhesive member may comprise any one or more of an epoxy, a thermosetting adhesive, and an ultraviolet curable adhesive.

The camera module may comprise a printed circuit board (PCB) 50. The printed circuit board 50 may be a substrate or circuit board. A lens driving device 10 may be disposed in the printed circuit board 50. A sensor base may be disposed between the printed circuit board 50 and the lens driving device 10. The printed circuit board 50 may be electrically connected to the lens driving device 10. An image sensor 60 may be disposed in the printed circuit board 50. The printed circuit board 50 may comprise various circuits, elements, and control units to convert an image being formed at the image sensor 60 into an electrical signal and transmit it to an external device.

The camera module may comprise an image sensor 60. The image sensor 60 may be a configuration in which the light passing through the lens and the filter 30 is incident to form an image. The image sensor 60 may be mounted on the printed circuit board 50. The image sensor 60 may be electrically connected to the printed circuit board 50. For an example, the image sensor 60 may be coupled to the printed circuit board 50 by a surface mounting technology (SMT). As another example, the image sensor 60 may be coupled to the printed circuit board 50 using a flip chip technology. The image sensor 60 may be disposed such that an optical axis coincides with a lens. That is, the optical axis of the image sensor 60 and the optical axis of the lens may be aligned. The image sensor 60 may convert light being irradiated onto an effective image region of the image sensor 60 into an electrical signal. The image sensor 60 may be any one among a charge coupled device (CCD), a metal oxide semi-conductor (MOS), a CPD, and a CID.

The camera module may comprise a motion sensor 70. The motion sensor 70 may be mounted on a printed circuit board 50. The motion sensor 70 may be electrically connected to a control unit 80 through a circuit pattern provided on the printed circuit board 50. The motion sensor 70 may output rotational angular velocity information due to the movement of the camera module. The motion sensor 70 may comprise a 2-axis or 3-axis gyro sensor or an angular velocity sensor.

The camera module may comprise a control unit 80. The control unit 80 may be disposed in the printed circuit board 50. The control unit 80 may be electrically connected to the coil 130 of the lens driving device 10. The control unit 80 may individually control the direction, intensity, and amplitude of current supplied to the coil 130. The control unit 80 may perform an auto focus function by controlling the lens driving device 10. The control unit 80 may be electrically connected to the Hall sensor 140. The control unit 80 may detect the position of the mover 200 through the Hall sensor 140 and perform autofocus feedback control for the lens driving device 10.

The camera module may comprise a connector 90. The connector 90 may be electrically connected to the printed circuit board 50. The connector 90 may comprise a port for electrical connection with an external device.

Hereinafter, an optical device according to the present embodiment will be described with reference to drawings.

Figure 28:
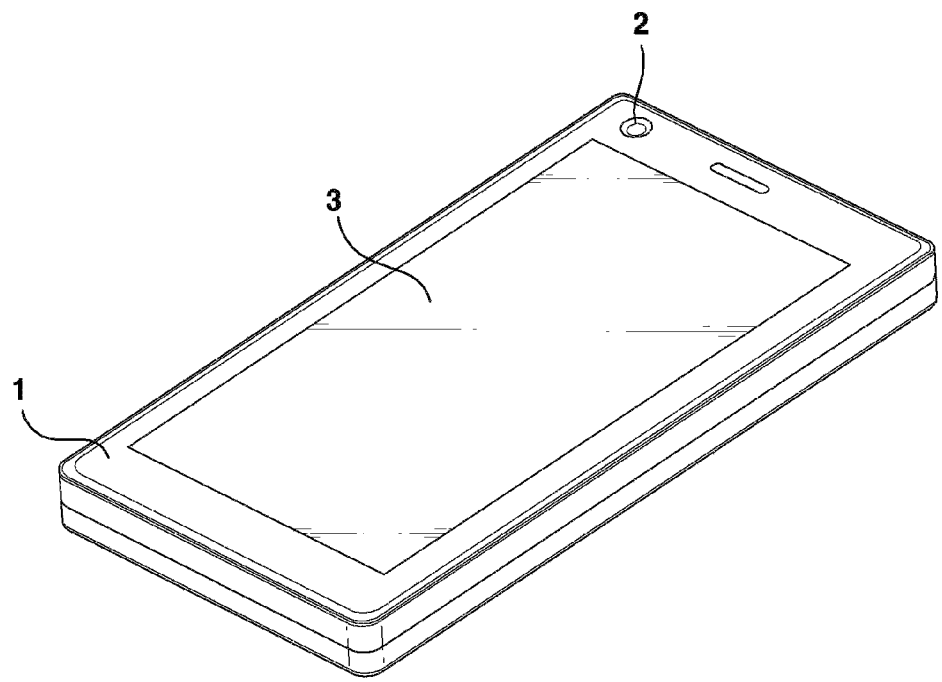
FIG. 28 is a perspective view of an optical device according to a present embodiment.

FIG. 28 is a perspective view of an optical device according to a present embodiment.

Optical devices comprise cell phones, portable phones, smart phones, portable communication devices, portable smart devices, portable terminals, digital cameras, computers, laptop computers, digital broadcasting terminals, personal digital assistants (PDAs), portable multimedia players (PMI's), and navigation. However, the type of optical device is not limited thereto, and any device for photographing a video or photo may be comprised in the optical device.

The optical device may comprise a main body 1. The main body 1 may form the outer appearance of an optical device. The main body 1 can accommodate the camera module 2. A display 3 may be disposed on a first surface of the main body 1. As an example, the display 3 and the camera module 2 are disposed on a first surface of the main body 1, and a camera module 2 may be additionally disposed on a second surface at an opposite side of the first surface of the main body 1.

The optical device may comprise a camera module 2. The camera module 2 may be disposed in the main body 1. At least a portion of the camera module 2 may be accommodated inside the main body 1. The camera module 2 may be provided in plurality. The camera module 2 may comprise dual, triple or more camera modules. The camera module 2 may be disposed at each of the first surface of the main body 1 and the second surface at an opposite side of the first surface of the main body 1. The camera module 2 may photograph an image and/or video of a subject.

The optical device may comprise a display 3. The display 3 may be disposed in the main body 1. The display 3 may be disposed on a first surface of the main body 1. The display 3 may output images and/or videos photographed by the camera module 2.

Although the embodiment of the present invention has been described above with reference to the accompanying drawings, those of ordinary skill in the art to which the present invention belongs will understand that the present invention may be embodied in other specific forms without changing the technical spirit or essential features thereof. Therefore, it should be understood that the embodiments described above are illustrative in all respects and not restrictive.

The invention claimed is:

1. A lens driving device comprising:
a fixed portion;
a mover disposed so as to be movable relative to the fixed portion and comprising a housing and a holder; and
a driving unit configured to move the mover,
wherein the driving unit comprises a first driving unit configured to move the holder and a second driving unit configured to move the housing,
wherein at least a portion of the first driving unit and at least a portion of the second driving unit are disposed on a first side surface of the fixed portion,
wherein the first driving unit comprises a first coil and a first magnet, and the second driving unit comprises a second coil and a second magnet,
wherein the fixed portion comprises a base and a substrate disposed on the base,
wherein the base comprises first and second surfaces disposed opposite each other, and third and fourth side surfaces disposed opposite to each other,
wherein the substrate comprises a first portion disposed on the first side surface of the base, a second portion disposed on the second side surface of the base, a third portion disposed on the third side surface of the base, and a fourth portion disposed the fourth side surface of the base,
wherein each of the first coil and the second coil comprises a coil disposed on the second portion of the substrate, and
wherein the second coil is not disposed on the third and fourth portions of the substrate.

2. The lens driving device of claim 1, wherein each of the first coil and the second coil comprises a coil disposed on the first side surface of the fixed portion.

3. The lens driving device of claim 1, wherein each of the first magnet and the second magnet comprises a magnet disposed on the first side surface of the fixed portion.

4. The lens driving device of claim 1, wherein the first coil is configured to move the holder in a direction perpendicular to an optical axis direction, and wherein the second coil is configured to move the holder and the housing in the optical axis direction.

5. The lens driving device of claim 1, wherein the first coil comprises coils disposed on the third and fourth portions of the substrate.

6. The lens driving device of claim 1, wherein the first magnet comprises four magnets disposed on four side surfaces of the holder, respectively, and
wherein the second magnet comprises two magnets disposed on two side surfaces of the housing opposite each other, respectively.

7. The lens driving device of claim 1, further comprising a first ball contacted with the holder and the housing,
wherein the first ball is disposed on a surface of the holder.

8. The lens driving device of claim 7, further comprising a first yoke disposed on a surface of the housing opposite to a surface where the first ball contacts the housing,
wherein the first yoke is overlapped with the first magnet and the first ball in an optical axis direction.

9. The lens driving device of claim 7, wherein the first ball comprises four balls, and
wherein an imaginary plane connecting centers of the four balls is perpendicular to an optical axis direction.

10. The lens driving device of claim 1, further comprising a second ball contacted with the housing and the base,
wherein the second ball comprises two balls disposed symmetrically with respect to an optical axis.

11. The lens driving device of claim 10, further comprising a second yoke disposed on the substrate,
wherein the second yoke is overlapped with the second magnet in a direction perpendicular to an optical axis direction.

12. The lens driving device of claim 1, wherein the first magnet comprises a magnet facing the first coil disposed on the first portion of the substrate, and
wherein the second magnet comprises a magnet facing the second coil disposed on the first portion of the substrate.

13. The lens driving device of claim 1, wherein the base comprises two protruding portions protruding from the third side surface of the base and spaced apart from each other in optical axis direction,
wherein the third portion of the substrate comprises a first area disposed with the first coil, and a second area extending from the first area and disposed between the two protruding portions of the base, and
wherein, in an optical axis direction, a length of the first area of the substrate is greater than a length of the second area of the substrate.

14. A camera module comprising:
a printed circuit board;
an image sensor disposed on the printed circuit board;
the lens driving device of claim 1 disposed on the printed circuit board; and
a lens coupled with the holder of the lens driving device.

15. An optical device comprising:
a main body;
the camera module of claim 14 disposed on the main body; and
a display disposed on the main body and configured to output at least any one of an image and a video photographed by the camera module.

16. A lens driving device comprising:
a base comprising first to fourth side surfaces;
a substrate disposed on the base;
a housing configured to move in a vertical direction with respect to the base;

a holder configured to move in a horizontal direction with respect to the housing;

a first driving unit configured to move the housing; and a second driving unit configured to move the holder, wherein a part of the first driving unit is disposed on the first side surface and the third side surface facing each other, wherein the second driving unit comprises a first unit driving unit partially disposed on the first side surface and a second unit driving unit partially disposed on the fourth side surface, wherein the first unit driving unit and the second unit driving unit are configured to move the holder in different directions, wherein the first driving unit comprises a first coil and a first magnet, and the second driving unit comprises a second coil and a second magnet, wherein the base comprises first and second surfaces disposed opposite each other, and third and fourth side surfaces disposed opposite to each other, wherein the substrate comprises a first portion disposed on the first side surface of the base, a second portion disposed on the second side surface of the base, a third portion disposed on the third side surface of the base, and a fourth portion disposed the fourth side surface of the base, wherein each of the first coil and the second coil comprises a coil disposed on the second portion of the substrate, and wherein the second coil is not disposed on the third and fourth portions of the substrate.

* * * * *